United States Patent
Bose et al.

(10) Patent No.: US 10,858,933 B2
(45) Date of Patent: Dec. 8, 2020

(54) METHOD FOR ANALYZING CEMENT INTEGRITY IN CASING STRINGS USING MACHINE LEARNING

(71) Applicant: SCHLUMBERGER TECHNOLOGY CORPORATION, Sugar Land, TX (US)

(72) Inventors: Sandip Bose, Brookline, MA (US); Maja Skataric, Cambridge, MA (US); Smaine Zeroug, Lexington, MA (US); Bikash Kumar Sinha, Cambridge, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 348 days.

(21) Appl. No.: 15/575,024

(22) PCT Filed: May 18, 2016

(86) PCT No.: PCT/US2016/032965
§ 371 (c)(1),
(2) Date: Nov. 17, 2017

(87) PCT Pub. No.: WO2016/187242
PCT Pub. Date: Nov. 24, 2016

(65) Prior Publication Data
US 2018/0149019 A1    May 31, 2018

Related U.S. Application Data

(60) Provisional application No. 62/163,243, filed on May 18, 2015.

(51) Int. Cl.
*E21B 49/00* (2006.01)
*G06N 20/00* (2019.01)
(Continued)

(52) U.S. Cl.
CPC ............. *E21B 49/00* (2013.01); *E21B 47/005* (2020.05); *G01V 1/44* (2013.01); *G01V 1/50* (2013.01);
(Continued)

(58) Field of Classification Search
CPC ..... E21B 49/00; E21B 47/0005; G06N 20/00; G06N 7/005; G01V 1/44; G01V 1/50; G01V 2210/542
See application file for complete search history.

(56) References Cited

U.S. PATENT DOCUMENTS

| 3,909,775 A | 9/1975 | Lavigne |
| 4,289,023 A | 9/1981 | Rader |

(Continued)

FOREIGN PATENT DOCUMENTS

| WO | 2014139593 A1 | 9/2014 |
| WO | WO2014139593 * | 9/2014 |

(Continued)

OTHER PUBLICATIONS

Xie et al., "Testing and validating machine learning classifiers by metamorphic testing", The Journal of Systems and Software 84 (2011) 544-558 (Year: 2011).*

(Continued)

*Primary Examiner* — Regis J Betsch
(74) *Attorney, Agent, or Firm* — Trevor G. Grove

(57) ABSTRACT

The present disclosure provides methods and systems for analyzing cement integrity in a depth interval of a wellbore having a multiple string casing with an innermost annulus disposed inside at least one outer annulus. The method includes processing ultrasonic data obtained from ultrasonic measurements on the interval of the wellbore to determine properties of the innermost annulus. The method also includes processing sonic data obtained from sonic mea- (Continued)

surements on the interval of the wellbore to extract features of the sonic data. The features of the sonic data are input to a machine learning processing to determine properties of both the innermost annulus and the least one outer annulus. Additional processing of ultrasonic and sonic data can also be used to determine properties of both the innermost annulus and the least one outer annulus. These properties can be used to analyze cement integrity in the depth interval of the wellbore.

26 Claims, 25 Drawing Sheets

(51) Int. Cl.
  *G01V 1/50* (2006.01)
  *G01V 1/44* (2006.01)
  *G06N 7/00* (2006.01)
  *E21B 47/005* (2012.01)

(52) U.S. Cl.
  CPC ............. *G06N 7/005* (2013.01); *G06N 20/00* (2019.01); *G01V 2210/542* (2013.01)

(56) References Cited

U.S. PATENT DOCUMENTS

| | | | |
|---|---|---|---|
| 4,594,691 | A | 6/1986 | Kimball et al. |
| 4,800,537 | A | 1/1989 | Mount, II |
| 4,896,303 | A | 1/1990 | Leslie et al. |
| 5,278,805 | A | 1/1994 | Kimball |
| 6,611,761 | B2 | 8/2003 | Sinha et al. |
| 6,941,231 | B2 | 9/2005 | Zeroug et al. |
| 7,095,676 | B2 | 8/2006 | DAngelo et al. |
| 7,639,563 | B2 | 12/2009 | Wu et al. |
| 7,643,374 | B2 | 1/2010 | Plona et al. |
| 9,533,487 | B2 | 1/2017 | Knauer et al. |
| 9,784,875 | B2 | 10/2017 | Zeroug et al. |
| 9,829,597 | B2 | 11/2017 | Zeroug et al. |
| 10,012,749 | B2 * | 7/2018 | Bose ................ G01V 1/50 |
| 10,138,727 | B2 | 11/2018 | Zeroug et al. |
| 2002/0116128 | A1 | 8/2002 | Sinha et al. |
| 2003/0058739 | A1 | 3/2003 | Hsu et al. |
| 2003/0185100 | A1 | 10/2003 | DAngelo et al. |
| 2005/0190651 | A1 | 9/2005 | Plona et al. |
| 2006/0039238 | A1 | 2/2006 | Mandal et al. |
| 2006/0120217 | A1 | 6/2006 | Wu et al. |
| 2006/0233048 | A1 * | 10/2006 | Froelich ............... G01V 1/50 367/35 |
| 2006/0235617 | A1 | 10/2006 | Sinha et al. |
| 2006/0262644 | A1 | 11/2006 | Schoepf et al. |
| 2007/0206439 | A1 | 9/2007 | Barolak et al. |
| 2009/0168597 | A1 * | 7/2009 | Wu ................ E21B 47/0005 367/35 |
| 2013/0255937 | A1 * | 10/2013 | Barnes ................ E21B 33/14 166/253.1 |
| 2013/0345983 | A1 | 12/2013 | Guo |
| 2014/0052376 | A1 | 2/2014 | Guo et al. |
| 2015/0003203 | A1 | 1/2015 | Froelich |
| 2015/0198732 | A1 | 7/2015 | Zeroug et al. |
| 2015/0219780 | A1 | 8/2015 | Zeroug et al. |
| 2017/0167241 | A1 | 6/2017 | Wu et al. |
| 2018/0142545 | A1 | 5/2018 | Lei et al. |
| 2018/0149019 | A1 | 5/2018 | Bose et al. |
| 2018/0156759 | A1 | 6/2018 | Lei et al. |
| 2019/0055830 | A1 | 2/2019 | Skataric et al. |

FOREIGN PATENT DOCUMENTS

| | | |
|---|---|---|
| WO | 2015108639 A1 | 7/2015 |
| WO | 2016003549 A1 | 1/2016 |
| WO | 2016187239 A1 | 11/2016 |
| WO | 2016187240 A1 | 11/2016 |
| WO | 2016187242 A1 | 11/2016 |

OTHER PUBLICATIONS

"Isolating Potential Flow Zones During Well Construction", in American Petroleum Institute Recommended Practice 65—Part 2, first Edition, May 2010, 107 pages.

Ekstrom, M. P., "Dispersion estimation from borehole acoustic arrays using a modified matrix pencil algorithm", 29th Asilomar Conference on Signals, Systems, and Computers, Pacific Grove, California, U.S.A., 1995, pp. 449-453.

Hayman, A. J. et al., "High Resolution Cementation and Corrosion Imaging by Ultrasound", presented at the 1991 SPWLA 32nd Annual Logging Symposium, 1991, 25 pages.

Lang, S. et al., "Estimating slowness dispersion from arrays of sonic logging waveforms", Geophysics, 1987, 52(4), pp. 530-544.

Liu, Y. et al., "Acoustic Guided Waves in Cylindrical Solid-Fluid Structures: Modeling with a Sweeping Frequency Finite Element Method and Experimental Validation", AIP Conference Proceedings, 2017, 36, 8 pages.

Pistre, V. et al., "A Modular Wireline Sonic Tool for Measurements of 3D (Azimuthal, Radial, and Axial) Formation Acoustic Properties", presented at the SPWLA 46th Annual Logging Symposium, New Orleans, Louisiana, U.S.A., 2005, pp. 13 pages.

Pistre, V. et al., "A New Modular Sonic Tool Provides Complete Acoustic Formation Characterization", 2005 SEG International Exposition and Annual Meeting Proceedings, SEG Houston, Texas, U.S.A., 2005, pp. 368-372.

Van Kuijk, R. et al., "A Novel Ultrasonic Cased-Hole Imager for Enhanced Cement Evaluation", IPTC 10546, presented at the International Petroleum Technolgy Conference, Doha, Qatar, 2005, 14 oages.

Search Report and Written Opinion of related International Patent Application No. PCT/US2016/032963 dated Aug. 16, 2016, 21 pages.

Search Report and Written Opinion of related International Patent Application No. PCT/US2016/032961 dated Sep. 26, 2016,18 pages.

Search Report and Written Opinion of International Patent Application No. PCT/US2017/020311 dated Jun. 15, 2017, 21 pages.

* cited by examiner

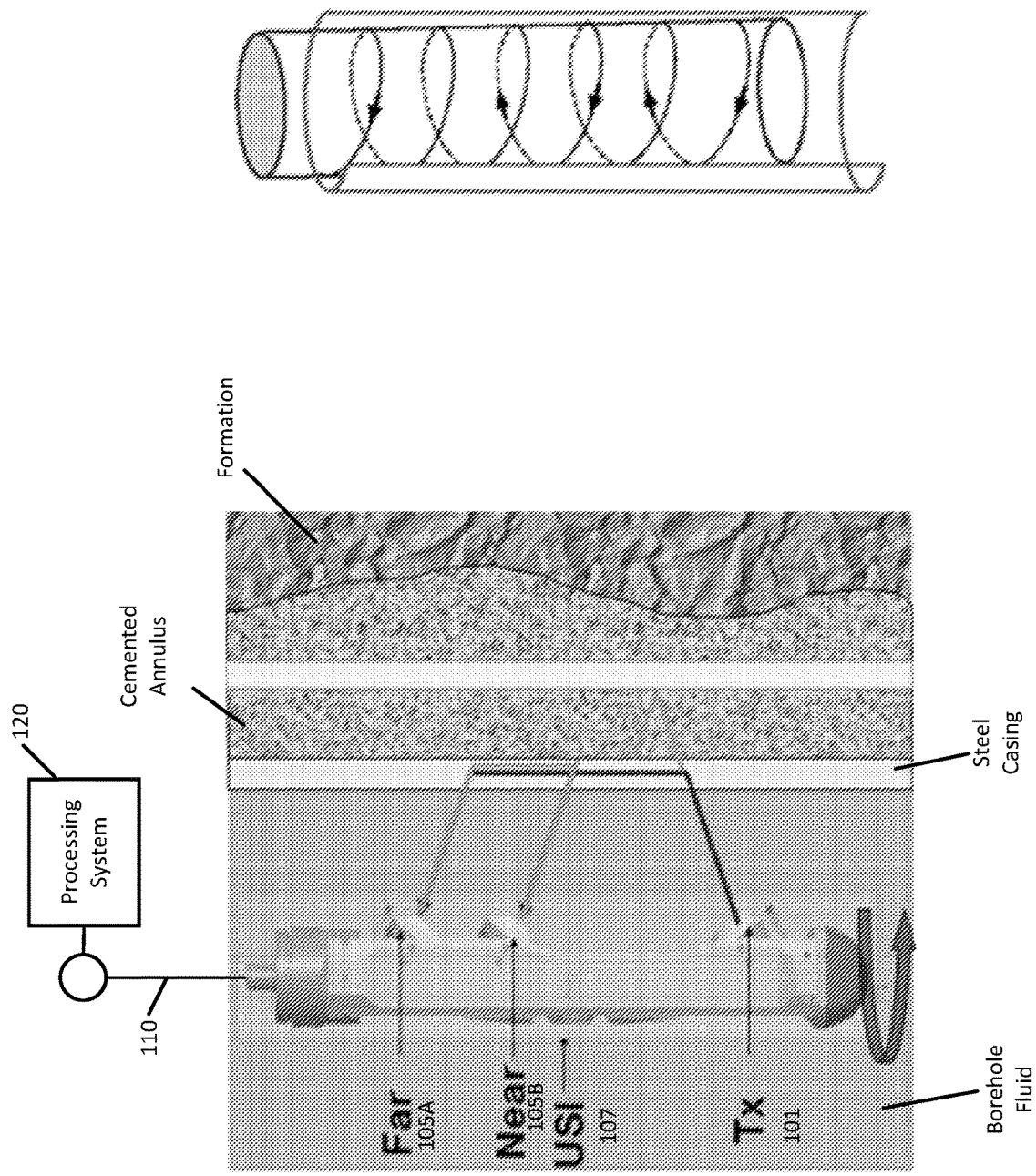

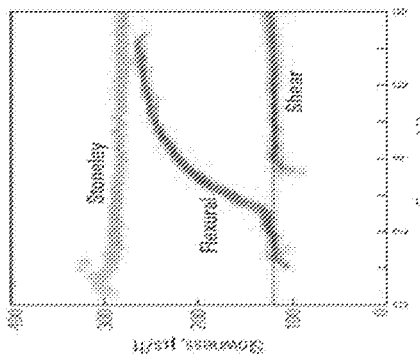
FIG. 4
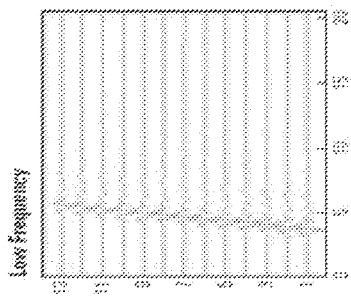
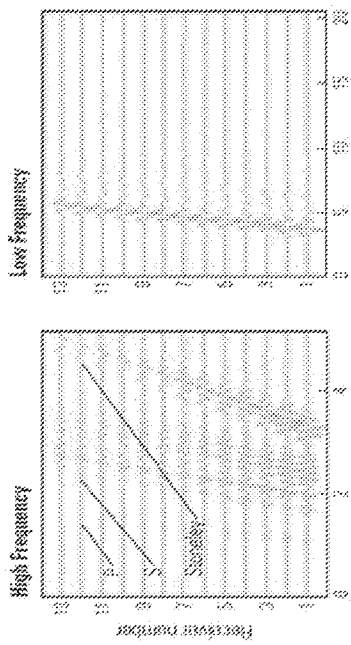
FIG. 5A
FIG. 5B
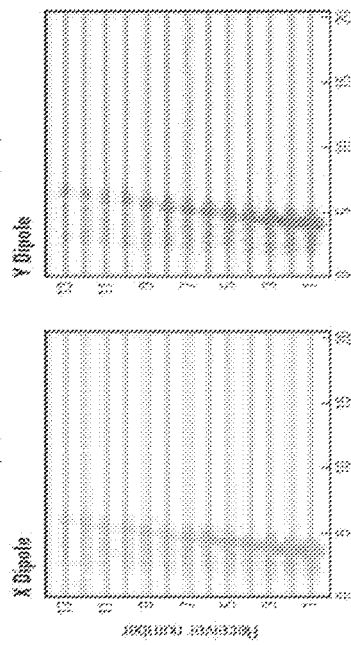
FIG. 5C
FIG. 5D
FIG. 5E

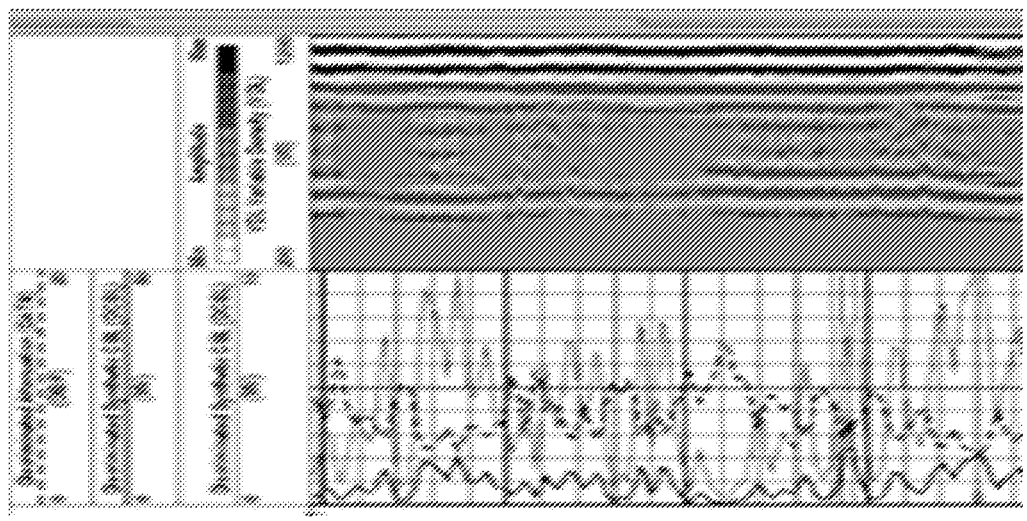
FIG. 7
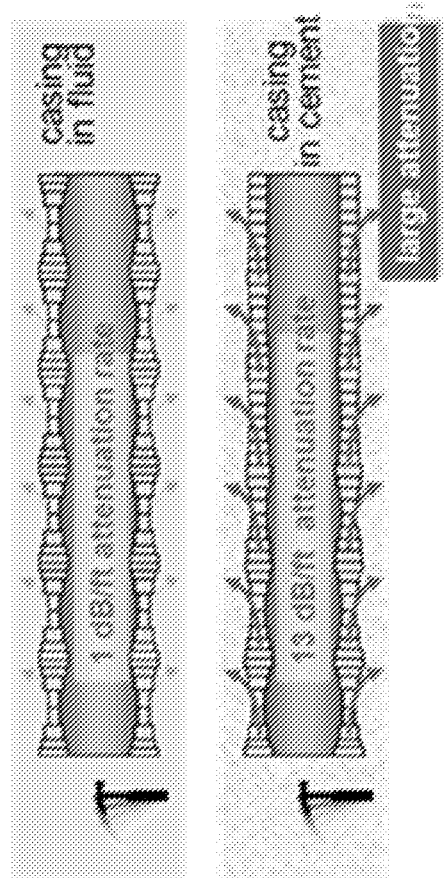
FIG. 6A
FIG. 6B

Algorithm 1: Inference through sampling input : (Observations) $\hat{x}_1, \ldots, \hat{x}_n, \hat{y}_1, \ldots, \hat{y}_n$, where $n \in \{1, 2, \ldots, N\}$
input : (Hyperparameters) $v_0, \alpha_0, \mu_0, \kappa_0, \alpha_k, \sigma_k$, where $k \in \{1, 2, \ldots, K\}$
output: $\pi_k, z_{nk}$
begin while *length of MCMC chain < pre-defined LEN* do
  Updating allocation $z_{nk}$ for each sample according to
  $$z_{nk} \sim \text{Cat}(k, p_{n1}, p_{n2}, \ldots, p_{nK})$$
  $$p_{nk} = E[p_{nk}] = \frac{\pi_k \mathcal{N}(x_n|\mu_{a_k}, \sigma_{a_k})}{\sum_{m=1}^{K} \pi_m \mathcal{N}(x_n|\mu_{a_m}, \sigma_{a_m})}$$
  for *component $k \leftarrow 1$ to $K$ of the mixture model* do
    Update $\mathcal{L}(\hat{y}|y_k)$
    $$\mathcal{L}(\hat{y}|x_n, z_{nk}, \ldots, x_n) \propto \mathcal{IG}(v_k|2, v_{a_k}\sigma_{a_k}^2/2), \quad y_k = f(x_k)$$
    Update $\sigma_{a_k}^2$ and $x_k$ according to
    $$\sigma_{a_k}^2|x_n, z_{nk}, \ldots, x_n \propto \mathcal{IG}(v_{a_k}/2, v_{a_k}\sigma_{a_k}^2/2)$$
    $$v_{a_k} = v_0 + n$$
    $$\kappa_{a_k} = \kappa_0 + n$$
    $$\sigma_{a_k}^2 = \frac{1}{v_{a_k}}[v_0\sigma_0^2 + S^2 + \frac{\kappa_0 n}{\kappa_{a_k}}(\bar{y}_k - m_0)^2],$$
    $$x_k \propto F = \mathcal{N}(\mu_{a_k}, \sigma_{a_k}^2/\kappa_{a_k}) \cdot \mathcal{L}(\hat{y}|y_k)$$
    $$\mu_{a_k} = \frac{\kappa_0\mu_0 + n\bar{y}}{\kappa_{a_k}},$$
  end
  Update $\pi_k$ according to $\pi_k \propto \text{Dir}(\pi_{a_k}, \alpha_k)$
  save $\pi_k, z_{nk}$ in the chain
  end
end

FIG. 12C

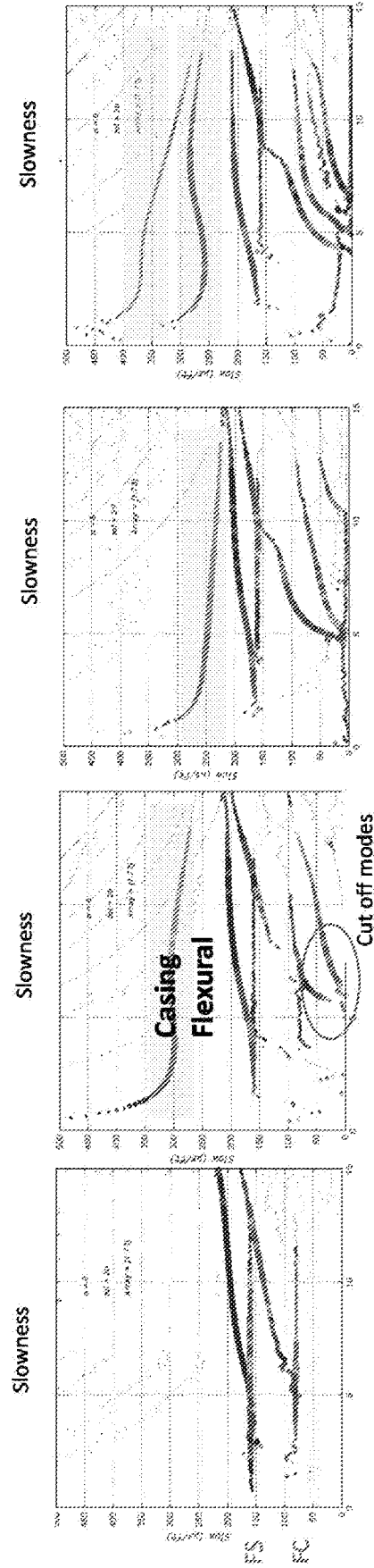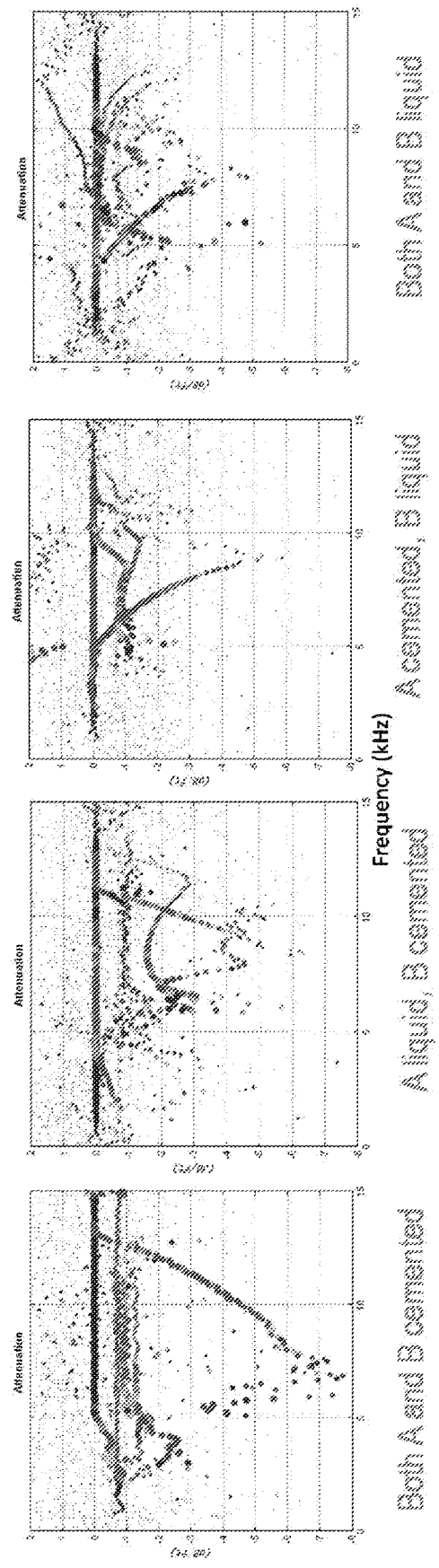
FIG. 17A

METHOD FOR ANALYZING CEMENT INTEGRITY IN CASING STRINGS USING MACHINE LEARNING

RELATED APPLICATIONS

The present application claims the benefit of U.S. Provisional Application Ser. No. 62/163,243, filed on May 18, 2015 and entitled "METHOD FOR ANALYZING CEMENT INTEGRITY IN CASING STRINGS USING MACHINE LEARNING", which is hereby incorporated by reference herein in its entirety.

This application is related to:
A PCT Application claiming the benefit of U.S. Provisional Application Ser. No. 62/163,336, filed on May 18, 2016, and entitled "METHOD FOR ANALYZING CEMENT INTEGRITY IN CASED WELLS USING SONIC LOGGING", which is hereby incorporated by reference herein in its entirety;

A PCT Application claiming the benefit of U.S. Provisional Application Ser. No. 62/163,336, filed on May 18, 2016, and entitled "METHODS FOR ANALYZING CEMENT QUALITY IN MULTI-STRING CASED WELLS USING SONIC LOGGING", which is hereby incorporated by reference herein in its entirety;

U.S. Provisional Application Ser. No. 62/303,152 filed on Mar. 3, 2016 and entitled "WELL INTEGRITY ANALYSIS USING SONIC MEASUREMENTS OVER DEPTH INTERVAL", which is hereby incorporated by reference herein in its entirety.

TECHNICAL FIELD

This disclosure relates to well logging in oil and gas fields. In particular, this disclosure relates to analyzing cement integrity in cased wells.

BACKGROUND

Effective diagnosis of well zonal isolation has become important with the recent advent of tougher governmental regulations that call for oil and gas operators to deliver and maintain wells with competent pressure seals. The goal is to prevent uncontrolled flow of subterranean formation fluids causing leaks to the surface (e.g., atmosphere or sea) or into other formations. See "Isolating Potential Flow Zones During Well Construction," American Petroleum Institute Recommended Practice 65, Part 2, First Edition (May 2010). The diagnosis of well zonal isolation can be carried out following a cementation job or during the life of a well or at the end of its life before plug and abandonment.

SUMMARY

Illustrative embodiments of the present disclosure are directed to a methods and systems for analyzing cement integrity in a depth interval of a cased wellbore having a multiple string casing with an innermost annulus disposed inside at least one outer annulus. The method includes processing ultrasonic data obtained from ultrasonic measurements on the depth interval of the wellbore to determine properties of the innermost annulus. Sonic data obtained from sonic measurements on the depth interval of the well is processed to extract features of the sonic data. The features of the sonic data are input to a machine learning processing to determine properties of both the innermost annulus and the at least one outer annulus.

In some embodiments, the properties of the innermost annulus as determined from the processing of the ultrasonic data and the properties of the innermost annulus and the at least one outer annulus as determined by the machine learning processing can be stored in computer-readable storage media for analysis of the cement integrity in the interval of the well.

In some embodiments, the trained machine learning processing can use the properties of the innermost annulus as determined from the processing of the ultrasonic data as a constraint in the determination of the properties of the innermost annulus and the at least one outer annulus.

In some embodiments, the machine learning processing includes a machine learning classifier. The classifier can be trained for a variety of anticipated conditions of the innermost annulus and the at least one outer annulus in different formation types and wellbore fluids. The training of the machine learning classifier can use synthetic sonic data (computed with one or more modeling algorithms) in supervised learning mode as well as field data in unsupervised or semi-supervised mode. The machine learning processing and machine learning classifier can be validated, for example, using field data and/or modelled data (computed with one or more modeling algorithms) with pertubations and noise and/or combinations thereof.

In some embodiments, the properties of both the innermost annulus and the at least one outer annulus as determined by the machine learning processing can include fill states for both the innermost annulus and the least one outer annulus. Such fill states represent one of a solid, liquid, and gas phase of the material of both the innermost annulus and the at least one outer annulus. The properties of the innermost annulus and the outer annulus can also include bond state for either or both of the innermost annulus and the least one outer annulus in the case of solid fill. The bond state for the innermost annulus or the at least one outer annulus can characterize interfacial conditions of cement to casing bonding or cement to formation bonding.

In some embodiments, the machine learning processing can determine properties of both the innermost annulus and the at least one outer annulus that correspond to the features of the sonic data. The features can be specific attributes of slowness and attenuation dispersions of the sonic data. The sonic data can arise from monopole excitation, dipole excitation, and/or quadrupole excitation. The attributes can one of: (a) a number and dispersion characteristics of Stoneley modes arising from a monopole excitation; (b) a number and dispersion characteristics of casing extensional modes arising from a monopole excitation; (c) a number and dispersion characteristics of dipole flexural modes arising from a dipole excitation; (d) a number and dispersion characteristics of cut-off modes arising from a dipole excitation; (e) presence of formation modes arising from a dipole excitation; (f) a number and dispersion characteristics of quadrupole modes arising from a quadrupole excitation; and/or (g) slowness and attenuation dispersion characteristics of the modes present.

In some embodiments, the ultrasonic measurements can include ultrasonic pulse echo and pitch-catch measurements. The processing of the ultrasonic data can include an inversion of the ultrasonic data to determine the properties of the innermost annulus fill and bond. The properties determined by the inversion of the ultrasonic data can include: (a) compressional wavespeed $V_p$ as a function of azimuth direction $\phi$ and axial depth $z$; (b) shear wavespeed $V_s$ as a function of azimuth direction ϕ and axial depth z; (c) density ρ as a function of azimuth direction ϕ and axial depth z; (d) acoustic impedance Z as a function of azimuth direction ϕ and axial depth z; (e) bond parameters as a function of azimuth direction ϕ and axial depth z; (f) bond state as a function of azimuth direction ϕ and axial depth z; (g) annulus fill state as a function of azimuth direction ϕ and axial depth z; and/or (h) a measure of casing eccentering as a function of axial depth z. The inversion of the ultrasonic data can employ a hierarchical Bayesian graphical model to determine certain properties of the innermost annulus. The certain properties can include the fill state and bond state for the innermost annulus.

In some embodiments, the method can further include processing sonic data obtained from sonic measurements on the depth interval of the well in order to determine properties of the at least one outer annulus. The processing of the sonic data can perform an inversion of the sonic data to determine the properties of the at least one outer annulus. The properties identified by the inversion of the sonic data can include: (a) compressional wavespeed $V_p$ as a function of azimuth direction ϕ and axial depth z; (b) shear wavespeed $V_s$ as a function of azimuth direction ϕ and axial depth z; (c) density ρ as a function of azimuth direction ϕ and axial depth z; (e) acoustic impedance Z as a function of azimuth direction ϕ and axial depth z; and/or (f) bond parameters as a function of azimuth direction ϕ and axial depth z. The inversion of the sonic data can use the properties of the innermost annulus as determined from the processing of the ultrasonic data as a constraint in the determination of the properties of the at least one outer annulus. The properties of the at least one outer annulus as determined from the processing of the sonic data can be stored in computer-readable storage media for analysis of the cement integrity in the interval of the well.

The ultrasonic and sonic data can be acquired with one or more sonic logging and ultrasonic logging tools in the well having the multiple string casing.

Additional aspects, embodiments, objects and advantages of the disclosed methods may be understood with reference to the following detailed description taken in conjunction with the provided drawings.

BRIEF DESCRIPTION OF THE DRAWINGS

FIG. 2A is a diagram of the pitch-catch flexural wave measurement that can be carried out by the ultrasonic logging tool of FIG. 1A.

FIG. 2B is a schematic illustration of the data acquisition with the ultrasonic logging tool of FIGS. 1A and 2A.

FIG. 4 is a schematic diagram of the sonic logging tool of FIG. 3A in an open hole.

FIG. 5A is a plot of multiple acquisitions acquired by the receiver array of the sonic logging tool of FIG. 4 arising from a high frequency monopole excitation.

FIG. 5B is a plot of multiple acquisitions acquired by the receiver array of the sonic logging tool of FIG. 4 arising from a low frequency monopole excitation.

FIGS. 5C and 5D are plots of multiple acquisitions acquired by the receiver array of the sonic logging tool of FIG. 4 arising from cross-dipole excitations.

FIG. 5E are dispersion plots that illustrate the slowness-frequency variation of various wellbore guided modes of FIGS. 5A, 5B, 5C and 5D.

FIGS. 6A and 6B are schematic illustrations of the principle of operations of a CBL-VDL measurement that can be performed by the sonic logging tool of FIG. 3A.

FIG. 7 illustrates an exemplary CBL-VDL log.

FIG. 12C illustrates a Monte Carlo Markov chain algorithm that can be used to train the hierarchical Bayesian graphical model of FIGS. 11, 12A and 12B.

FIG. 13A shows the third interface echo obtained with the flexural wave imaging modality of the ultrasonic logging tool tracked on a VDL image. FIGS. 13B and 13C are plots of the estimated magnitude of the inner casing eccentering (with respect to outer casing) in the X and Y coordinate directions, respectively. FIG. 13D is a cement compressional velocity map obtained using the attenuation dispersion.

FIG. 17A shows the phase dispersion characteristics (upper row plots) and attenuation dispersion characteristics (lower row plots) arising from a dipole excitation for a dual casing string within a fast formation with different fill states in an innermost annulus and an outer annulus of the dual casing string.

DESCRIPTION OF ILLUSTRATIVE EMBODIMENTS

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Acoustic measurements are widely used to provide a diagnosis of the condition of the placed cement. However, inversion and interpretation methods for these acoustic measurements can suffer from limitations that impede their effectiveness to render an unambiguous diagnosis on what fills the annular space between primary casing and secondary casing and secondary casing and formation in a double string situation. More specifically, the inversion and interpretation methods for these acoustic measurements can be affected by several conditions, including structural conditions (i.e., tool position within the casing, geometry of the casing within the hole, geometry of the hole, etc., intrinsic material properties (the bulk properties of annular material, casing, formation, and wellbore fluid), and interfacial conditions (such as properties of the bond of the cement to casing as well as properties of the bond of the cement to formation). These conditions require data from multiple acoustic measurements with ideally orthogonal sensitivities in order to solve for previously unknown parameters (such as cement wave velocities and bonding parameters) that characterize the condition on what fills the annular space between primary casing and secondary casing and secondary casing and formation in the double string situation.

There are two types of acoustic measurements that are commonly used for used diagnosis of the condition of the placed cement. The first type of acoustic measurement is an ultrasonic (high-frequency) measurement in the signal frequency range from 80 kHz to several hundred kHz. The second type of acoustic measurement is a sonic (low-frequency) measurement in the signal frequency range from a few hundreds of Hz to 20 kHz.

Figure 1A:
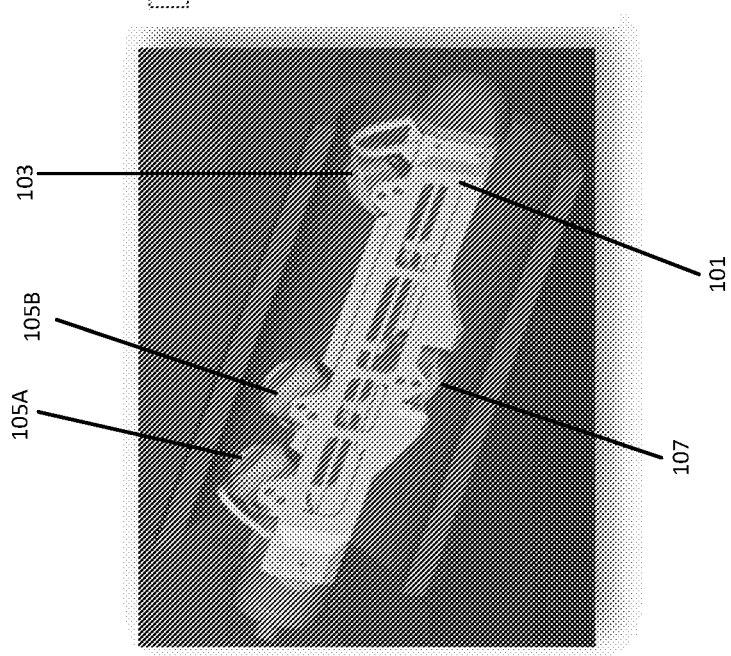
FIG. 1A is a drawing of an illustrative ultrasonic logging tool.
Figure 1B:
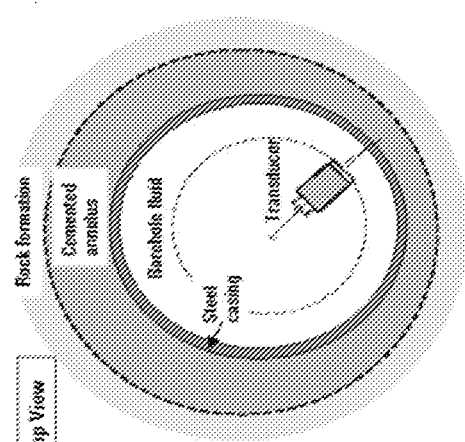
FIG. 1B is a schematic illustration of a pulse-echo measurement that can be carried out by the ultrasonic logging tool of FIG. 1A.
Figure 1C:
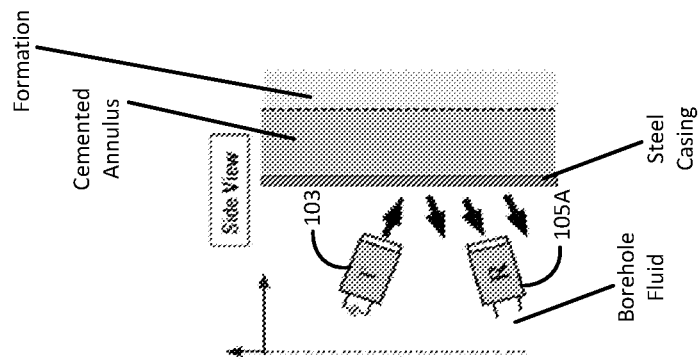
FIG. 1C is a schematic illustration of a pitch-catch flexural wave measurement that can be carried out by the ultrasonic logging tool of FIG. 1A.

FIG. 1A shows a schematic illustration of an ultrasonic logging tool, which includes a transmitter 103 and two receivers 105A, 105B arranged in a pitch-catch path as well as a transceiver 107 located opposite the pitch-catch path as shown. The transceiver 107 is configured to perform a pulse-echo measurement to obtain ultrasonic data within a cased hole environment, as shown in FIG. 1B. The transmitter 103 and two receivers 105A, 105B are configured to perform a pitch-catch flexural wave measurement to obtain ultrasonic data within the cased hole environment, as shown in FIG. 1C. The ISOLATION SCANNER of Schlumberger Technology Corporation of Sugar Land, Tex. is an example of an ultrasonic logging tool configured to carry out two different ultrasonic (high-frequency) measurements: a pulse-echo measurement and a pitch-catch flexural wave measurement. The pulse-echo measurement is performed at 180 degrees relative to the pitch-catch flexural wave measurement as evident from the arrangement of the transceiver 107 relative to the pitch-catch path of the transmitter 103 and two receivers 105A, 105B shown in FIG. 1A. The cased hole environment is comprised of, from inward to outward, the wellbore fluid, the steel casing, a cemented annulus, and surrounding rock formation.

The ultrasonic logging tool in FIG. 1A is a wireline logging tool 10. The logging tool is lowered into the wellbore on a wireline 110 (as shown in FIG. 2A). The wireline 110 can be used to communicate with a processing system 120 at a surface location (as shown in FIG. 2A). The processing system 120 can be used to control operation of the wireline logging tool and/or process data acquired by the wireline logging tool (e.g., according to the methods described herein).

For the pulse-echo measurement, the transceiver 107 emits an acoustic beam pulse at normal incidence to the casing inner wall and receives the return echo. See Hayman et al., "High Resolution Cementation and Corrosion Imaging by Ultrasound," presented at the 1991 SPWLA 32nd Annual Logging Symposium, June 16-19 and Van Kuijk et al., "A Novel Ultrasonic Cased-Hole Imager for Enhanced Cement Evaluation," paper presented at the International Petroleum Technology Conference, Doha, Qatar, 21-23 Nov. 2005. This pulse-echo measurement technique is also embedded in the USI (Ultrasonic Imager), which is a wireline downhole tool commercially available from Schlumberger Technology Corporation of Sugar Land, Tex. At normal incidence and in thin steel casings that are 15 mm-thick and thinner, a casing thickness mode is excited in the typical frequency range of 200-500 kHz and leads to a resonant response for the received waveform. This casing mode corresponds to the casing S1 Lamb mode. The Lamb modes are complex vibrational waves that travel through the entire thickness of a material. While different Lamb modes are possible, two of the most common types of Lamb modes are the symmetric and anti-symmetric modes. Inversion can be used to estimate the decaying amplitude of the resonance response (casing S5 Lamb mode) of the received waveform and associate it with an acoustic impedance Z, which is equal to the product of compressional wavespeed and density. The pulse-echo measurement and inversion can be applied to multiple azimuth directions $\phi$ and different axial depths z in the cased well environment in order to characterize the acoustic impedance Z as a function of azimuth direction $\phi$ and axial depth z in the cased well environment. The acoustic impedance Z can be used as an estimate for the cement acoustic impedance $Z_{cmt}$ as a function of azimuth direction $\phi$ and axial depth z in the cased well environment. In thicker casing (>15 mm), the received signal is seen to be made of temporal isolated echoes arising from multiple resolvable reflections occurring at the casing walls. Processing of the amplitudes of these echoes can provide an estimation of the cement acoustic impedance $Z_{cmt}$ as a function of azimuth direction $\phi$ and axial depth z in the cased well environment.

The primary limitation of the pulse-echo technique is its inability to probe deeper than the immediate casing-cement region. Furthermore, the accuracy of the inversion is strongly dependent on the acoustic impedance of the wellbore fluid within which the tool is immersed. Further, the amplitude decay is equally sensitive to the acoustic impedance of the cement as it is to its bond with the casing. Specifically, a disbond reflecting a physical gap at the casing-cement interface reduces the inverted acoustic impedance of the cement to being close to that of fluid resulting in ambiguity as to whether there is cement or fluid behind the casing.

For the pitch-catch flexural wave measurement, the transmitter 103 and the far and near receivers 105A, 105B cooperate to excite and receive fundamental quasi-Lamb modes of the casing as shown in FIG. 2A so as to probe behind the casing. The quasi-Lamb modes received by the far and near receivers 105A, 105B can include the zeroth-order anti-symmetric mode (A0) referred to as the flexural mode and the zeroth-order symmetric mode (S0) referred to as the extensional mode. It should be noted that the method can also accommodate the excitation and processing of additional quasi-Lamb modes of higher-order (A1, A2, S1, S2, etc.). Attributes of the quasi-Lamb modes (particularly, the flexural mode) as they propagate along the surface of the casing depends on the properties of the cement in the annular space beyond the casing and its bond to the casing. Such attributes can be extracted from the received signals as measured by the far and near receivers 105A, 105B and used to invert for cement properties as a function of azimuth direction $\phi$ and axial depth z in the cased well environment. For example, such attributes can include the peak amplitude associated with one or more echoes propagating in the casing as the echoes decay from the near receiver 105B to the far receiver 105A (this is referred to as the flexural attenuation or Flex_ATT) and is used to discriminate cement from liquid and gas. In another example, such attributes can include properties of a reflection echo at the cement-formation interface, referred to as the third-interface echo or TIE. When the TIE is present in the data, the transit time of the TIE can be used to invert for the compressional wavespeed $V_p$ and/or the shear wavespeed $V_s$ of the cement as a function of azimuth direction $\phi$ and axial depth z in the cased well environment. Note that the TIE can be single or multiple echoes depending on the cement properties. For example, the TIE can be a single shear-shear (SS) reflection echo for a cement with a compressional wavespeed $V_p$ larger than roughly 2800 m/s; in this case, the cement is said to be acoustically fast (for example, non-mud-contaminated class H cements belong to this category). In another example, the TIE can be two or three echoes representing compressional-compressional (PP), converted PS/SP, and SS reflections for a cement with a compressional wavespeed $V_p$ less than roughly 2500 m/s; in this case, the cement is said to be acoustically slow (for example, light-weight and foam cements belong to this category). Note that inversion of these attributes can yield either the compressional wavespeed $V_p$ or the shear wavespeed $V_s$ of the cement or both depending on the echoes tracked and available for inversion.

One limitation of the use of the flexural attenuation attributes (Flex_ATT) in the inversion is the fact that its dependence on the acoustic impedance of the cement $Z_{cmt}$ is double-valued, meaning low $Z_{cmt}$ (such as for lightweight cement) and high $Z_{cmt}$ (such as for class H cement) may have the same value of flexural attenuation (Flex_ATT). The acoustic impedance of the cement as derived from the pulse-echo measurement can be used to attempt to remove this ambiguity. However, given the problem with high sensitivity to mud impedance of the pulse-echo data inversion, as highlighted above, this integration is not always successful and can lead to errors.

Another limitation pertains to the fact that the TIE is not always present in the data for reasons that are believed to be due with either high elastic wave attenuation in the cement, large roughness of the cement-formation interface, or an elastic wave impedance match at the cement-formation interface.

Figure 3A:
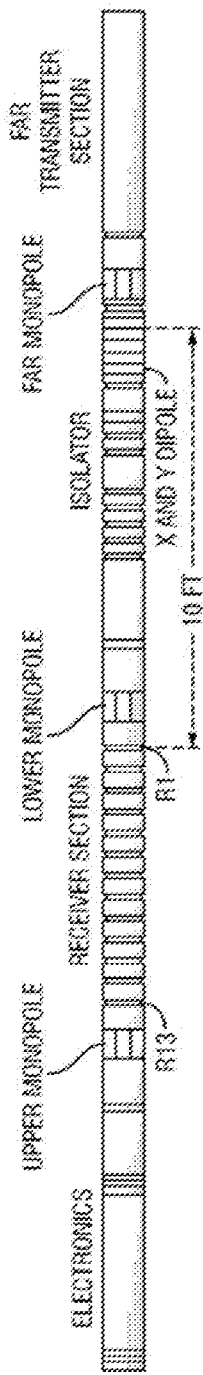
FIG. 3A is a drawing of an illustrative sonic logging tool.
Figure 3B:
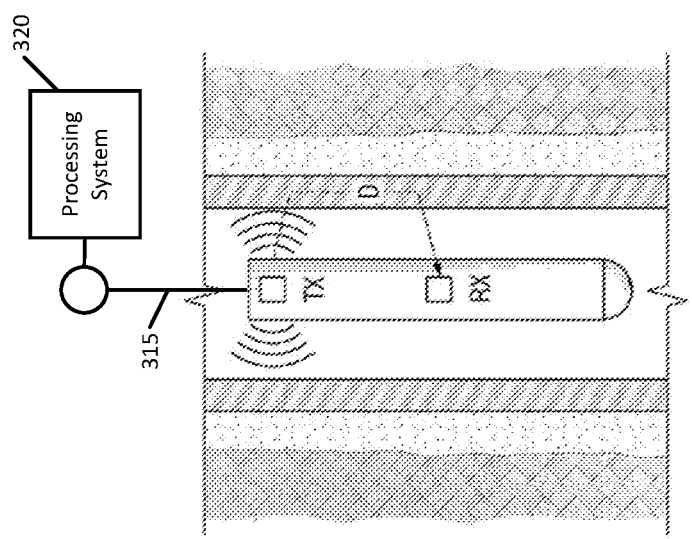
FIG. 3B is a schematic illustration of a sonic measurement that can be carried out by the sonic logging tool of FIG. 3A.

FIG. 3A shows a schematic diagram of a sonic logging tool. FIG. 3B shows the sonic logging tool in a cased well environment. In one embodiment, the sonic logging tool may include one or more monopole sources (transmitters) for generating acoustic waveforms that travel into the casing and the formation, one or more sets of dipole sources (transmitter pairs) for generating acoustic waveforms that travel into the casing and the formation, and an array of receivers 30 that record the waveforms to obtain sonic data. The sonic logging tool may include a multiplicity of transmitters and receivers in an axial and azimuthal array that can be configured to excite and detect multiple wellbore modes. These modes include a monopole mode that can be excited both at low and high frequencies and with far and near (with respect to the receiver array) monopole sources, a dipole mode that can be excited at two orthogonal directions yielding cross-dipole excitation, and a quadrupole mode for excitation at four orthogonal directions. The near monopole excitation can also provide the Cement-Bond-Log (CBL) signal as well as the Variable-Density-Log (VDL) signal, which are measurements available with older-generation cement bond log tools. Typically, the amplitude of the early-arriving part of the CBL signal is correlated to the presence of cement in the annulus with the signal being high whenever there is a lack of cement or a lack of good cement bond to the casing. The VDL signal can indicate whether formations arrivals are present or not. The presence of formation arrivals can indicate coupling to the formation through cement that is attached to the formation, and vice-versa for their absence.

The SONIC SCANNER of Schlumberger Technology Corporation of Sugar Land, Tex. is an example of a sonic logging tool that can be configured to carry out a number of different sonic (low-frequency) measurements as a function of azimuth direction $\phi$ and axial depth z in a cased well environment.

The sonic logging tool in FIG. 3A is a wireline logging tool. The logging tool is lowered into the wellbore on a wireline 315. The wireline 315 can be used to communicate with a processing system 320 at a surface location. The processing system 320 can be used to control operation of the wireline logging tool and/or process data acquired by the wireline logging tool (e.g., according to the methods described herein).

FIG. 4 shows sonic modal logging in an open hole with a sonic logging tool with multiple acquisitions. FIG. 5A shows sonic modal logging for a high frequency monopole mode. FIG. 5B shows sonic modal logging for a low frequency monopole mode. FIGS. 5C and 5D shows a dipole mode with cross-dipole exciations. FIG. 5E shows dispersion plots showing slowness-frequency variation of various wellbore guided modes of FIGS. 5A-5D. Note that these modes probe deeper and are sought to be used in a cased hole to diagnose, in particular, the annular fill and bond condition beyond the second casing in a multiple string casing.

FIGS. 6A and 6B are diagrams illustrating the principle of operation of the CBL logging measurement and the VDL logging measurement of a sonic logging tool. Specifically, the near monopole source insonifies the casing setting up a casing mode. This propagates with small attenuation in a free pipe but large attenuation in cemented casing. The measured amplitude of the casing mode at a receiver (or attenuation with two receivers) is interpreted in terms of cement placement and bond index as shown in the log plot of FIG. 7, which is used to observe the presence or absence of formation arrivals which serve as a qualitative indicator of acoustic coupling and therefore bond condition.

The sonic measurements of some sonic logging tools have several limitations including a lack of azimuthal resolution, low axial resolution (of the order of 1 m), and sensitivity to several mechanisms over the region it probes, such as casing eccentering, fluid channels, defects in the cement sheath, disbonding at either or both interfaces and covering the whole or a part of the azimuthal range, etc.

Figure 8:
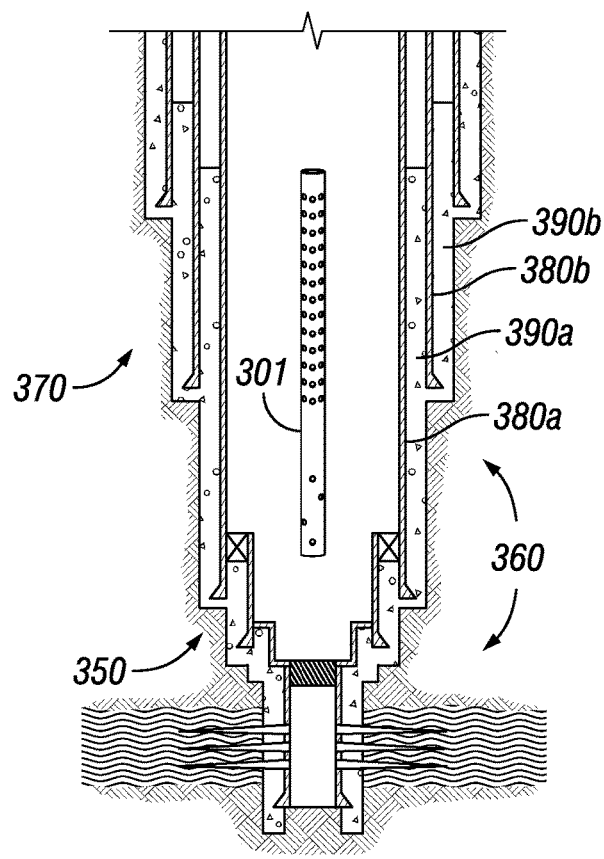
FIG. 8 shows well that employs a multiple casing string with cement placed between two overlapping casing strings and between the outermost casing string and the formation.
Figure 9A:
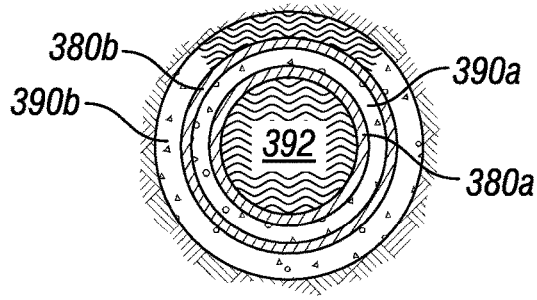
FIGS. 9A, 9B, 9C and 9D illustrate different scenarious for the fill state of an innermost annulus and an outer annulus of the multiple casing string of FIG. 8.
Figure 9B:
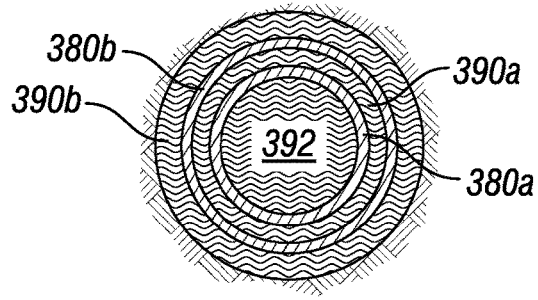
Figure 9C:
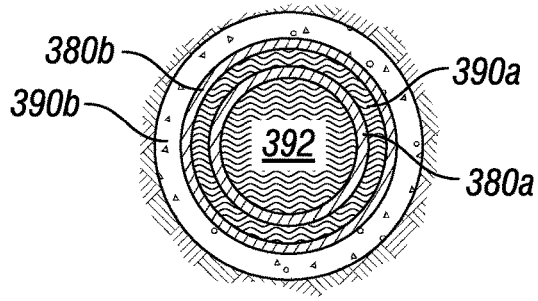
Figure 9D:
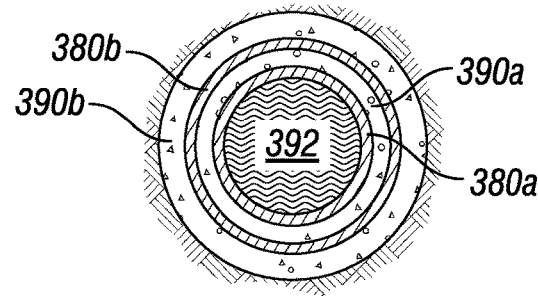

FIG. 8 shows a sonic logging tool 301 located in a plugged-in well 350 traversing a formation 360. The well 350 is shown to be cased with a multiple casing string 370. As described herein, a multiple casing string employs two or more casings whose lengthwise extents within a well overlap one another for at least part of the lengthwise extents of the two or more casings. Along the lengthwise extents of the overlapping casings, the multiple casing string forms a number of annuli, including an innermost annulus disposed within at least one outer annulus (or outer annuli). The innermost annulus is the annulus between the first and second casings (in the order from the central axis of the well toward the formation). The at least one outer annulus (or outer annuli) is the annulus (annuli) beyond the second casing. For purposes of illustration, a particular segment of the well is shown to have a first casing 380a and a second casing 380b with the first casing 380a surrounded by an annulus 390a and the second casing 380b surrounded by an annulus 390b. For part of its length, annulus 390a is located between casing 380a and the formation 360, and for part of its length, annulus 390a is located between casing 380a and casing 380b. For part of its length, annulus 390b is located between casing 380b and the formation 360. It will be appreciated that the annuli 390a, 390b of FIG. 8 may assume various states such as fully-cemented (with a full bond), liquid-filled, cemented only along part of the circumference, etc. Although other scenarios may be considered, in one embodiment the following scenarios are of particular interest: both annuli 390a, 390b are fully cemented; annulus 390a is liquid-filled and annulus 390b is fully-cemented; annulus 390a is fully-cemented and annulus 390b is liquid-filled; both annuli 390a, 390b are liquid-filled; there is a barite sag in one or both annuli 390a, 390b; and one or both annuli 390a, 390b are cemented only along part of their total circumference. FIGS. 9A-9D show some of these scenarios. FIG. 9A shows the innermost annulus 390a of cement, and an outer annulus 90b partially of cement and partially of liquid. FIG. 9B shows both innermost annulus 390a and the outer annulus 390b as liquid-filled. FIG. 9C shows the innermost annulus 390a as liquid-filled and the outer annulus 390b fully-cemented. FIG. 9D shows both the innermost annulus 390a and outer annulus 390b full-cemented. In all four figures, the inner casing (pipe) 380a is filled with mud 392.

The limitations of the ultrasonic measurements and the sonic measurements as described above can make it difficult to accurately characterize and diagnosis the condition of the placed cement, particularly for wells with a multiple casing string (FIG. 8). These limitations can be alleviated to some extent by a joint inversion of multiple acoustic modalities leveraging their independent sensitivities as described in US Patent Publ. No. 2015/0219780, commonly assigned to assignee of the present application. The acoustic modalities include currently available measurements as well as prospective ones that could be implemented in a cement evaluation tool. The anticipated result is a more robust diagnosis of the content of the annulus and whether it provides hydraulic isolation based on quantitative inversion of relevant parameters. This scheme is appropriate when adequate computation is available to run physically realistic forward models to carry out a complete inversion.

This disclosure describes a different approach that extracts attributes or features from a number of sonic measurements and uses these attributes as inputs into machine learning processing that uses a machine learning classifier to make a categorical diagnosis of the innermost annulus between the first and second casing as well as the at least one outer annulus beyond the second casing of the multiple casing string. In some embodiments, the machine learning processing (and classifier) can use a machine learning framework.

In one embodiment, the ultrasonic (high frequency) measurements of the ultrasonic logging tool and the sonic (low frequency) measurements of the sonic logging tool can be used to characterize and diagnosis the condition of placed cement in the multiple casing string of a well, such as the multiple casing string of FIG. 8. The ultrasonic (high frequency) measurements as well as the high frequency CBL measurements of the sonic logging tool can be used to characterize properties of the innermost annulus of the multiple casing string. Such properties can include compressional wavespeed $V_p$ as a function of azimuth direction $\phi$ and axial depth z, shear wavespeed $V_s$ as a function of azimuth direction $\phi$ and axial depth z, density $\rho$ as a function of azimuth direction $\phi$ and axial depth z, acoustic impedance Z as a function of azimuth direction $\phi$ and axial depth z, bond parameters and bond state as a function of azimuth direction $\phi$ and axial depth z, annulus fill state as a function of azimuth direction $\phi$ and axial depth z, and casing eccentering as a function of axial depth z. For this purpose, synergies in the pitch-catch and pulse-echo ultrasonic measurements of the ultrasonic logging tool as well as the CBL modalities of the sonic logging tool can be exploited using an integrated inversion methodology to obtain a robust characterization of the properties of the innermost annulus of the multiple casing string. The integrated inversion methodology can be based on hierarchical Bayesian networks. Furthermore, the sonic (low frequency) measurements of the sonic logging tool over a range of azimuth directions $\phi$ and axial depths z of the multiple casing string can be processed in conjunction with the machine learning processing to interpret properties (such as the fill state and bond state) of the at least one outer annulus (or outer annuli) of the multiple casing string over the range of azimuth directions $\phi$ and axial depths z of the cased well. For this purpose, monopole, dipole, and/or quadrupole modalities of the sonic logging tool at a given azimuth direction $\phi$ and axial depth z of the multiple casing string can be processed to obtain modal phase slowness and attenuation dispersion curves for the given azimuth direction $\phi$ and axial depth z. Features sensitive to the properties (such as the fill state and bond state) of the outer annulus (or outer annuli) of the multiple casing string for the given azimuth direction $\phi$ and axial depth z can be constructed from the modal phase slowness and attenuation dispersion curves for the given azimuth direction $\phi$ and axial depth z. Such features as derived from synthetic sonic data can be used to train the machine learning classifier in a supervised fashion such that the trained machine learning classifier outputs classes that correspond to such features, where the classes pertain to properties (such as the fill state and bond state) of the innermost annulus and the at least one outer annulus of the multiple casing string for the given azimuth direction $\phi$ and axial depth z for a variety of formations. These classes can be used to characterize and diagnosis the condition of placed cement in both the innermost annulus and the at least one outer annulus of the multiple casing string for the given azimuth direction $\phi$ and axial depth z. The trained machine learning classifier can be used in an unsupervised fashion with features derived from the multimode sonic measurements of the sonic logging tool for the given azimuth direction $\phi$ and axial depth z of the multiple casing string in conjunction with the properties of the innermost annulus as obtained from the integrated inversion methodology as described above for the given azimuth direction $\phi$ and axial depth z (collectively, field data) to output classes that correspond to such features for the given azimuth direction $\phi$ and axial depth z. The classes output by the trained machine learning classifier pertain to properties (such as the fill state and bond state) of the innermost annulus as well as the at least one outer annulus (and beyond) of the multiple casing string for the given azimuth direction $\phi$ and axial depth z as investigated by the ultrasonic and sonic logging tools. The trained machine learning processing can be applied over the range of azimuth directions $\phi$ and axial depths z of the multiple casing string investigated by the ultrasonic and sonic logging tools where the classes output by the trained machine learning classifier can be used to characterize properties (such as the fill state and bond state) of the innermost annulus as well as the at least one outer annulus (and beyond) of the multiple casing string over the range of azimuth directions $\phi$ and axial depths z of the multiple casing string as investigated by the ultrasonic and sonic logging tools.

Note that properties derived from both the integrated inversion of the ultrasonic data and the machine learning processing of the sonic data can be used to characterize and diagnose the condition of placed cement in both the innermost annulus as well as the least one outer annulus (and beyond) over a range of azimuth directions $\phi$ and axial depths z of the multiple casing string as investigated by the ultrasonic and sonic logging tools.

Figure 10:
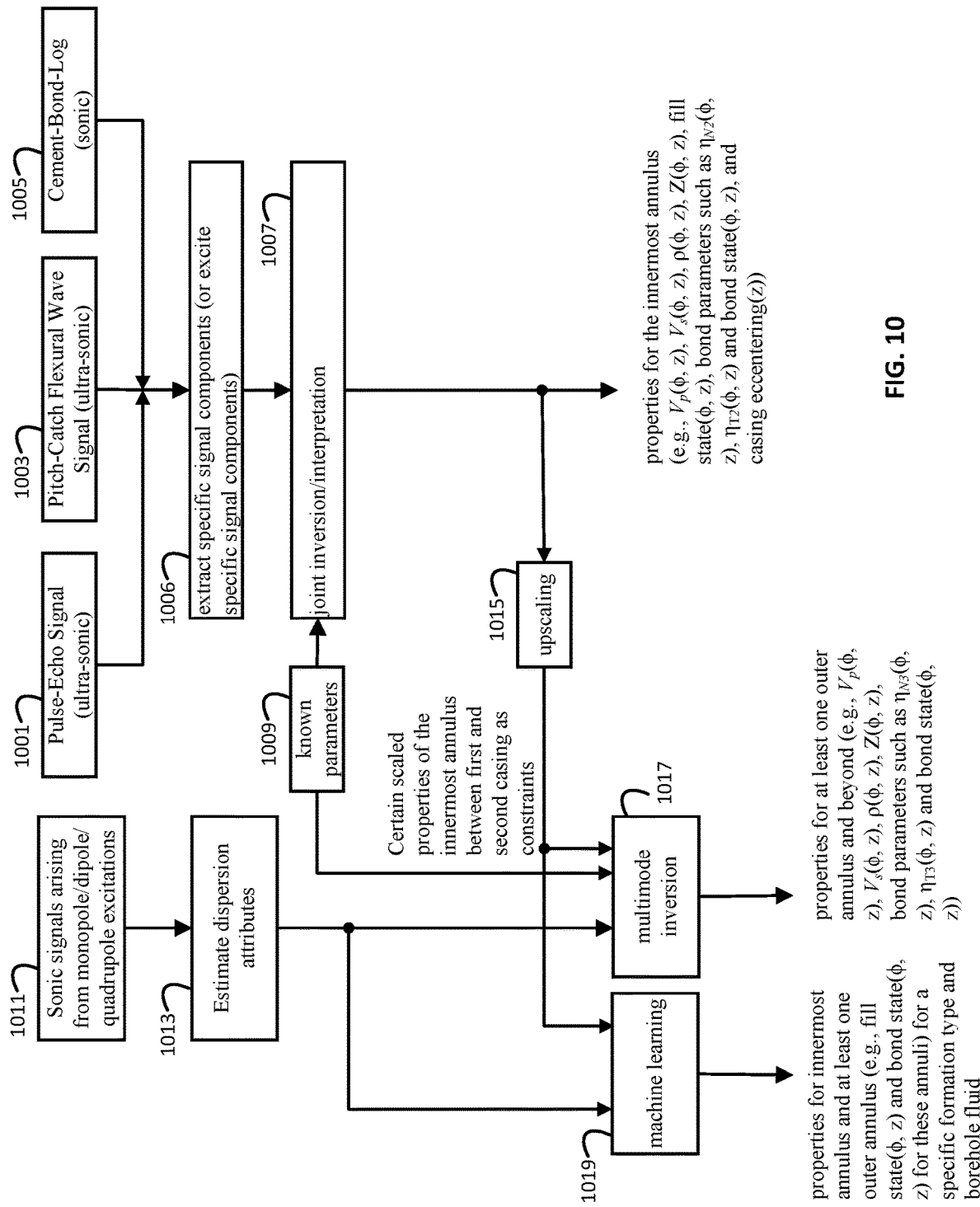
FIG. 10 shows a workflow for the integration of ultrasonic measurements performed by an ultrasonic logging tool and sonic measurements performed by a sonic logging tool for determining properties of the innermost annulus and one or more outer annuli of a multiple casing string where the innermost annulus is disposed inside at least one outer annulus; such properties can be used to evaluate the cement integrity of a multiple casing string that is part of a cased well, such as the multiple casing string of FIG. 8.

Turning to FIG. 10, an exemplary workflow is presented that uses the ultrasonic measurements (including the pulse-echo signal of block 1001 and the pitch-catch flexural wave signal of block 1003) of the ultrasonic logging tool and the sonic measurements (including the CBL of block 1005 and the sonic signals arising from monopole, dipole, and/or quadrupole excitations of block 1011) of the sonic logging tool to characterize and diagnosis the condition of placed cement in both the innermost annulus as well as the at least one outer annulus (and beyond) over a range of azimuth directions $\phi$ and axial depths z of a multiple casing string as investigated by the ultrasonic and sonic logging tools. Properties of the innermost annulus as a function of azimuth direction $\phi$ and axial depth z are derived by extracting specific signal components (or exciting specific signal components) of the pulse-echo signal of block 1001, the pitch-catch flexural wave signal of block 1003 and/or the CBL of block 1005 in block 1006 and jointly inverting or interpreting such signal components in block 1007. The joint inversion or interpretation of block 1007 employs known parameters (block 1009), such as casing parameters, mud parameters, hole geometry and tool parameters. The properties of the innermost annulus derived by the joint inversion or interpretation of block 1007 can include compressional wavespeed $V_p$ as a function of azimuth direction $\phi$ and axial depth z, shear wavespeed $V_s$ as a function of azimuth direction $\phi$ and axial depth z, density $\rho$ as a function of azimuth direction $\phi$ and axial depth z, acoustic impedance Z as a function of azimuth direction $\phi$ and axial depth z, bond parameters and bond state as a function of azimuth direction $\phi$ and axial depth z, annulus fill state as a function of azimuth direction $\phi$ and axial depth z, and casing eccentering (such as an angle and amplitude of the inner casing eccentering (location) with respect to the outer casing) as a function of axial depth z. The bond parameters for the case of a solid annular fill can be represented by a normal bond parameter $\eta_{N2}$ and a tangential bond parameter $\eta_{T2}$ for the first casing-cement interface. The normal and tangential bond parameters $\eta_{N2}, \eta_{T2}$ can conform to a compliance model to provide a corresponding bond state. For example, the bond parameters $\eta_{N2}$ or $\eta_{T2}$ having a value of zero means the first casing-cement interface is well bonded, the bond parameters $\eta_{N2}$ or $\eta_{T2}$ having a value greater than $\delta$ means the first casing-cement interface is detached or forms a microannulus, and the bond parameters $\eta_{N2}$ or $\eta_{T2}$ having a non-null quantity less than $\delta$ means the first casing-cement interface forms a partial bond. Note that similar bond parameters can be used to describe the bond state of the cement-casing interfaces at the second casing and beyond. Also note that similar bond parameters $\eta_{N3}$ and $\eta_{T3}$ can be used to describe the cement/formation interface beyond the second casing. The annulus fill state for a given azimuth direction $\phi$ and axial depth z can represent whether the annulus is filled with solid, liquid or gas at the given azimuth direction $\phi$ and axial depth z. Thus, the annulus fill state over different azimuth directions $\phi$ for a particular axial depth z can describe the azimuthal coverage of the cement at the particular depth. The properties of the innermost annulus derived by the joint inversion or interpretation of block 1007 can be stored in computer-readable storage media for analysis of the cement integrity in the interval of the well.

The joint inversion or interpretation of block 1007 can be accomplished as described in: (i) the single casing string case of Van Kuijk et al., "A Novel Ultrasonic Cased-Hole Imager for Enhanced Cement Evaluation," paper presented at the International Petroleum Technology Conference, Doha, Qatar, 21-23 Nov. 2005; and (ii) the joint inversion or interpretation of U.S. Patent Publ. No. 2015/0219780; both herein incorporated by reference in their entireties. In particular, the shallow reading ultrasonic data can be utilized to invert or interpret the properties of the innermost annulus of the multiple casing string. For example, because the innermost annulus is bordered by the steel first casing, the ultrasonic data are expected to exhibit third-interface reflection echoes due to the strong contrast at the steel-cement interface at the steel first casing. Such data should allow for more accurate inversion/interpretation of the compressional and shear acoustic wavespeeds of the innermost annulus (under the knowledge of the first and second casing diameters and thicknesses) as well as the amount of casing eccentering, if any present, between the first and second casings.

In the joint inversion or interpretation of block 1007, multiple measurements can be processed together to reduce non-uniqueness, uncertainty as well as the sensitivity to environmental (nuisance) parameters, such as those pertaining to the logging mud, that may not be known with enough accuracy. Furthermore, when the mud is highly attenuative, ultrasonic measurements may suffer while lower-frequency sonic measurements are much less affected. Additionally, if the casing-cement interface exhibits a microannulus filled with air (dry microannulus), the ultrasonic measurements are undermined and energy remains trapped within the casing with negligible transmission into the cement sheath. In this case, the lower frequency sonic measurements should couple to the cement and provides sensitivity to its condition.

Certain properties that are derived from the joint inversion or interpretation of block 1007 can be used to obtain constraints for the interpretation of the innermost and at least one outer annulus (and beyond) as carried out in blocks 1017 and 1019. The scale of the annuli properties derived in blocks 1007, 1017 and 1019 depends on the spatial resolution of the underlying ultrasonic and sonic measurements (blocks 1001, 1003, 1005, 1011). Typically, the spatial resolution of the ultrasonic measurements is much smaller than the spatial resolution of the sonic measurements. For example, the spatial resolution of the pulse-echo and pitch-catch ultrasonic measurements of the ISOLATION SCANNER tool is at a spatial scale of roughly 6 inches, and the spatial resolution of the sonic measurements of the SONICSCANNER tool is at a spatial scale ten time larger (roughly 75 inches), Thus, in order to use the lower-scale properties that are derived from the joint inversion or interpretation of block 1007 for the interpretation of blocks 1017 and 1019 based on the higher-scale sonic measurements, the certain lower-scale properties that are derived from the joint inversion or interpretation of block 1007 can be upscaled in block 1015 to the higher scale of the sonic measurements (block 1011) that underlie the interpretation of blocks 1017 and 1019. The upscaling of block 1015 can be performed through various ways. For example, volume-weighted averaging methods can be used for upscaling the compressional and shear acoustic wavespeeds derived from the joint inversion or interpretation of block 1007, whereas surface-weighted averaging can be used to upscale the bond parameters derived from the joint inversion or interpretation of block 1007.

In block 1013, certain attributes (such as phase slowness or attenuation) are extracted from the frequency dispersion of the multimode sonic signals arising from the monopole, dipole and/or quadrupole wellbore excitations of block 1011.

In block 1017, the multimode frequency dispersion attributes of block 1013 are inverted to derive properties of the least one outer annulus (and beyond) of the multiple casing string as a function of azimuth direction $\phi$ and axial depth z. The inversion of block 1017 employs the known parameters (block 1009), such as casing parameters, mud parameters, hole geometry and tool parameters. The properties derived by the inversion of block 1017 can include compressional wavespeed $V_p$ as a function of azimuth direction $\phi$ and axial depth z, shear wavespeed $V_s$ as a function of azimuth direction $\phi$ and axial depth z, density $\rho$ as a function of azimuth direction $\phi$ and axial depth z, acoustic impedance Z as a function of azimuth direction $\phi$ and axial depth z, bond parameters and bond state as a function of azimuth direction $\phi$ and axial depth z, and annulus fill state as a function of azimuth direction $\phi$ and axial depth z. The bond parameters for the case of a solid annular fill can be represented by a normal bond parameter $\eta_{N2}$ and a tangential bond parameter $\eta_{T2}$ for the second casing-cement interfaces similar to the bond parameters for the first casing-cement interfaces. Also note that similar bond parameters $\eta_{N3}$ and $\eta_{T3}$ can be used to describe the cement/formation interface beyond the second casing. The annulus fill state for a given azimuth direction $\phi$ and axial depth z can represent whether the annulus is filled with solid, liquid or gas at the given azimuth direction $\phi$ and axial depth z. Thus, the annulus fill state over different azimuth directions $\phi$ for a particular axial depth z can describe the azimuthal coverage of the cement at the particular depth. The inversion of block 1017 can be accomplished by the inversion schemes described in U.S. Patent Publ. No. 2015/0219780, incorporated by reference above in its entirety. Note that the scaled properties that are derived from the joint inversion or interpretation of block 1007 as output from block 1015 can be used as constraints in the inversion of block 1017. The properties of the least one outer annulus derived by the inversion or interpretation of block 1017 can be stored in computer-readable storage media for analysis of the cement integrity in the interval of the well.

In block 1019, the multimode frequency dispersion attributes of block 1013 for the given azimuth direction $\phi$ and axial depth z can be used as inputs to machine learning processing that uses a machine learning classifier. The machine learning processing operates on the multimode frequency dispersion attributes of block 1013 for the given azimuth direction $\phi$ and axial depth z to extract or label features of such attributes that are sensitive to the properties (such as the fill state and bond state) of the innermost annulus and the least one outer annulus of the multiple casing string for the given azimuth direction $\phi$ and axial depth z. The extracted features are supplied to the machine learning classifier, which operates in an unsupervised fashion to output the classes that correspond to such features. The classes output by the trained classifier pertain to properties (such as the fill state and bond state) of the innermost annulus and the at least one outer annulus of the multiple casing string for the given azimuth direction $\phi$ and axial depth z as investigated by the ultrasonic and sonic logging tools. The machine learning processing of block 1019 can applied over the range of azimuth directions $\phi$ and axial depths z of the multiple casing string investigated by the ultrasonic and sonic logging tools. In this case, the classes output by the machine learning classifier can be used to characterize properties (such as the fill state and bond state) of the innermost annulus and the at least one outer annulus of the multiple casing string over the range of azimuth directions $\phi$ and axial depths z of the multiple casing string as investigated by the ultrasonic and sonic logging tools. The properties of both the innermost annulus and the at least one outer annulus as derived by the machine learning processing of block 1019 can be stored in computer-readable storage media for analysis of the cement integrity in the interval of the well.

Note that properties output by blocks 1007, 1017 and 1019 of the workflow can be can be stored in computer-readable storage media and used to characterize and diagnosis the condition of placed cement in both the innermost annulus as well as the at least one outer annulus (and beyond) over a range of azimuth directions $\phi$ and axial depths z of the multiple casing string as investigated by the ultrasonic and sonic logging tools.

Figure 11:
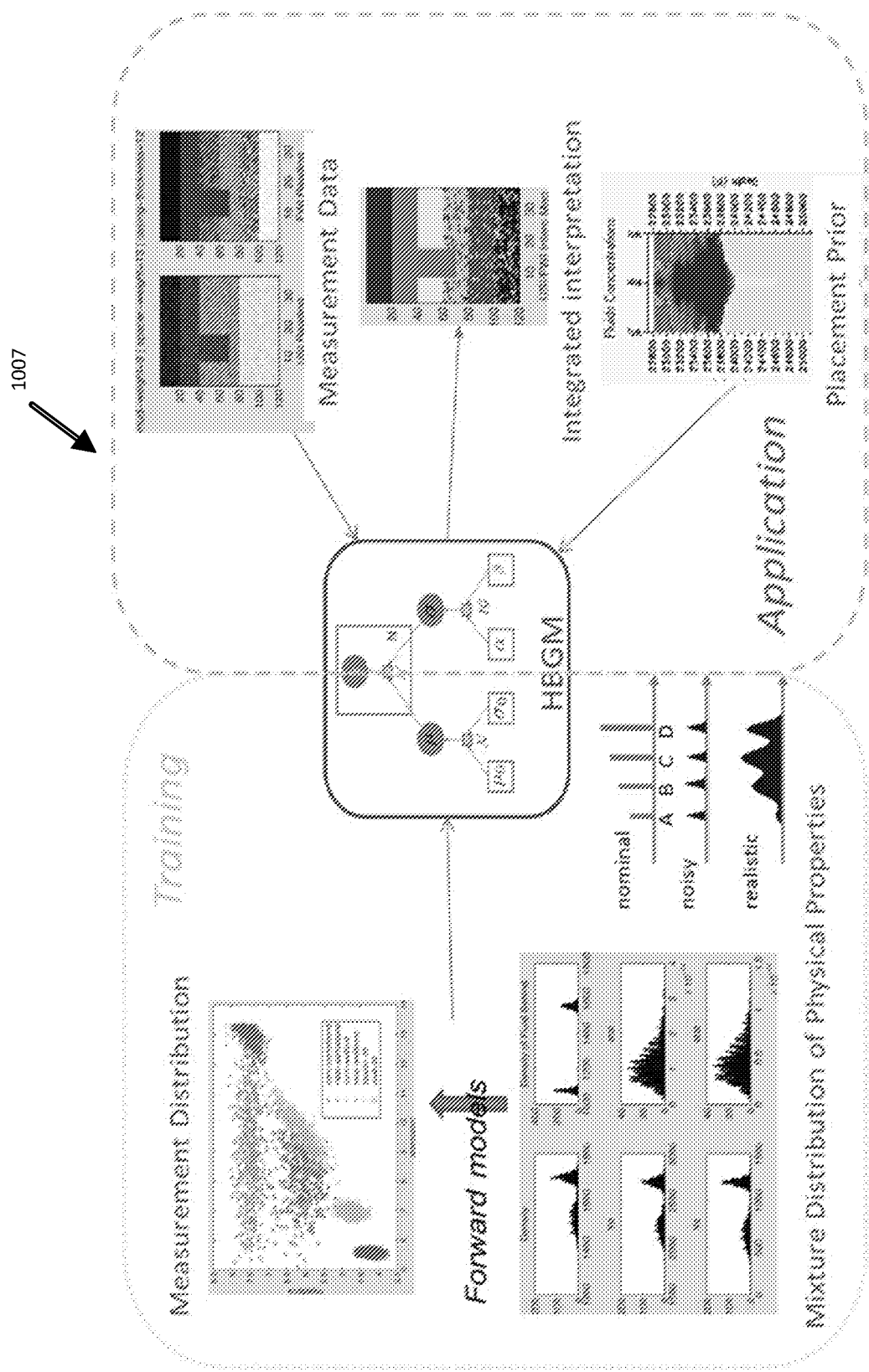
FIG. 11 shows a hierarchical Bayesian graphical model (HBGM) that can be used to interpret the ultrasonic data to determine the fill state and bond state for the innermost annulus of the multiple casing string.

In one embodiment, the joint inversion or interpretation of block 1007 can be accomplished with a hierarchical Bayesian graphical model based probabilistic approach as illustrated in FIGS. 11, 12A, 12B and 12C. FIG. 11 shows a workflow that derives the annulus fill state and bond state for the innermost annulus using a hierarchical Bayesian graphical model (HBGM) with an assumed mixture distribution for the annulus fill state and bond state. Forward models are used to generate the expected distribution of the proposed signal components (block 1006) which are used to train the hierarchical Bayesian graphical model. The trained hierarchical Bayesian graphical model can then be applied to the extracted signal components of block 1006 for a given azimuth direction $\phi$ and axial depth z of the multiple casing string as investigated by the ultrasonic and sonic logging tools to derive the properties (such the fill state and bond state) for the innermost annulus of the multiple string casing at the given azimuth direction $\phi$ and axial depth z. This processing can be applied a range of azimuth directions $\phi$ and axial depths z of the multiple casing string as investigated by the ultrasonic and sonic logging tools to derive the properties (such the fill state and bond state) for the innermost annulus of the multiple string casing over the range of azimuth directions $\phi$ and axial depths z. Note that the graphs of the HBGM, measurement data, mixture distribution data, integrated interpretation, and placement prior of FIG. 11 are schematic in nature with details that are not necessary to convey the workflow as depicted in the figure.

Figure 12A:
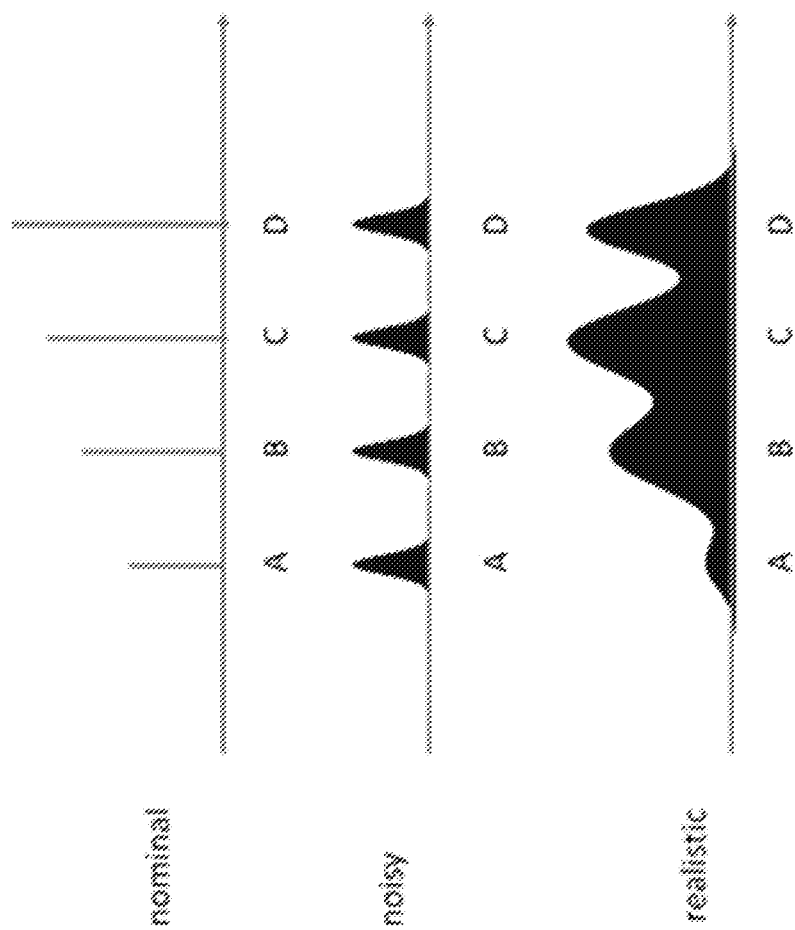
FIGS. 12A and 12B show a more detailed view of the hierarchical Bayesian graphical model of FIG. 11.
Figure 12B:
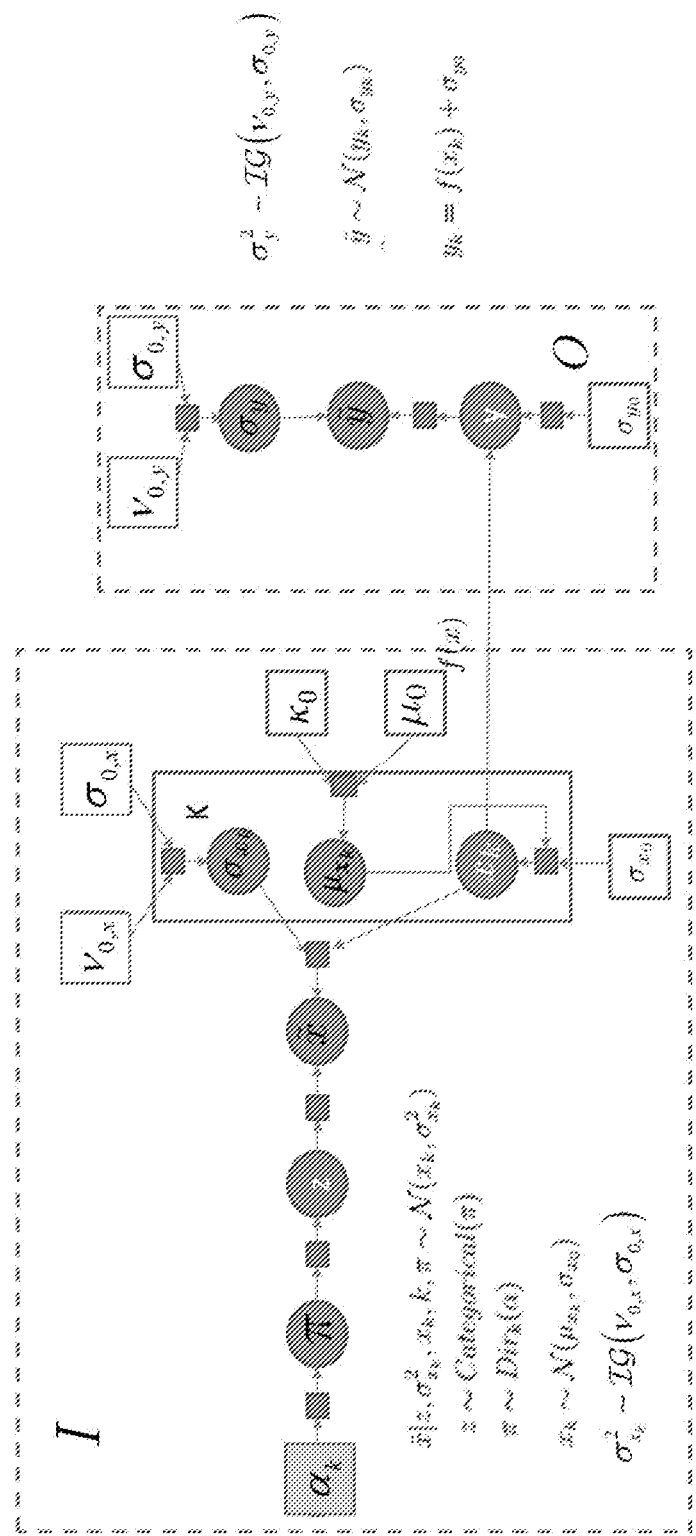

FIGS. 12A-D show more detail of the hierarchical Bayesian graphical model based interpretation suitable for block 1007. A mixture distribution is assumed for the states of nature comprising the innermost annulus fill state and bond state, obtained by perturbations around discrete categories (e.g. solid, liquid or gas in the annulus). This exploits the fact that the innermost annulus fill state can only be a finite set of possibilities or classes with perturbations due to factors such as cement setting, contamination, etc. FIG. 12A illustrates an example of how a realistic mixture distribution of an annulus property (such as annulus wavespeed as depicted in the bottom graph) is obtained by combining a probability distribution on choices from a finite set (classes A-D) of annulus property values (such as wavespeeds in hard cement, contaminated cement, spacer and mud as depicted by probability masses on nominal values representing these classes as shown in the top graph) and with distributions of perturbations around each of these nominal values corresponding to realistic material property variation for each class (as depicted in the middle graph). FIG. 12B illustrates a factor graph modelling the probabilistic relationship between the states of nature and the measured observations used in the hierarchical Bayesian interpretation. A joint distribution relating the states of nature (x, I) and the observations (y, O) is learned by training the hyper-parameters of model distribution parameters as shown using forward models relating states of nature to observations. Here the states of nature (x) refers to the unknown annular fill and bond conditions captured by the mixture distribution, with the allocation to a specific component (class) in the mixture indicated by a hidden variable, z, with a categorical distribution, and the perturbations within each class modelled by a Gaussian distribution Each of these distributions involve parameters, which in turn are postulated to have prior distributions governed by unknown hyperparameters to be determined. The observations represent the available measurements from the tools. The forward models are used to generate a mapping from the states of nature to predicted measurements using the known tool physics and casing geometry. Uncertainties in the measurements as well as in the forward models are captured by postulating distributions on the input and output space whose parameters can be inferred by learning the hyperparameters of their respective distributions as shown in the rectangular boxes. The distribution of the parameters are typically chosen to have the conjugate prior property to that of the states of nature and observations to allow for closed form estimates of the corresponding posterior distributions. In this example, the parameter 7C governing the categorical distribution of the mixture allocation variable z is drawn from a prior Dirichlet distribution (conjugate with respect to the categorical distribution), while the variance of the Gaussian distributions are likewise drawn from the inverse Gamma distributions (conjugate to Gaussian), as shown in the FIG. 12B The distribution of the measurements in the output space can be similarly represented as shown with the use of an inverse Gamma conjugate prior distribution for the variance. The relationship between the input and output spaces governed by the measurement physics model may not be addressed by using conjugate prior distributions. Instead, the relationship is captured using a Monte Carlo Markov chain based sampling, which uses forward model f(x) to generate likelihood estimates using the available measurements, iteratively samples from the input and output distributions, and updates and learns the unknown hyperparameters.

FIG. 12C shows an example of an update scheme using Monte Carlo Markov chain algorithm for learning the hyperparameters of the hierarchical Bayesian graphical model of FIG. 12B. Starting with initial assumed values of the hyperparameters and states of nature as well as the given observations y, these values are iteratively updated with resampling using the formulas for the conjugate distribution parameter updates and likelihood estimates, $\mathcal{L}$ for a prescribed number of runs, LEN, chosen so that the selected samples approximate the true underlying distributions. The details of these calculations and updates are illustrated in FIG. 12C and culminate at the end of the iterative process in learning the hyperparameters, number of mixture components (classes) of the mixture distribution of the relevant properties of the states of nature, the mixture allocation probability distribution, and the mean and variance within each of the classes. In this process, additional available information on cement placement such as from the cementing operation to place the cement into the annuli can be incorporated in this method by modifying the prior distributions. The network with these learned distributions can then be used for subsequent inference on the annular fill and bond states in the testing phase using the measurements over the depth zones of interest.

Figure 12D:
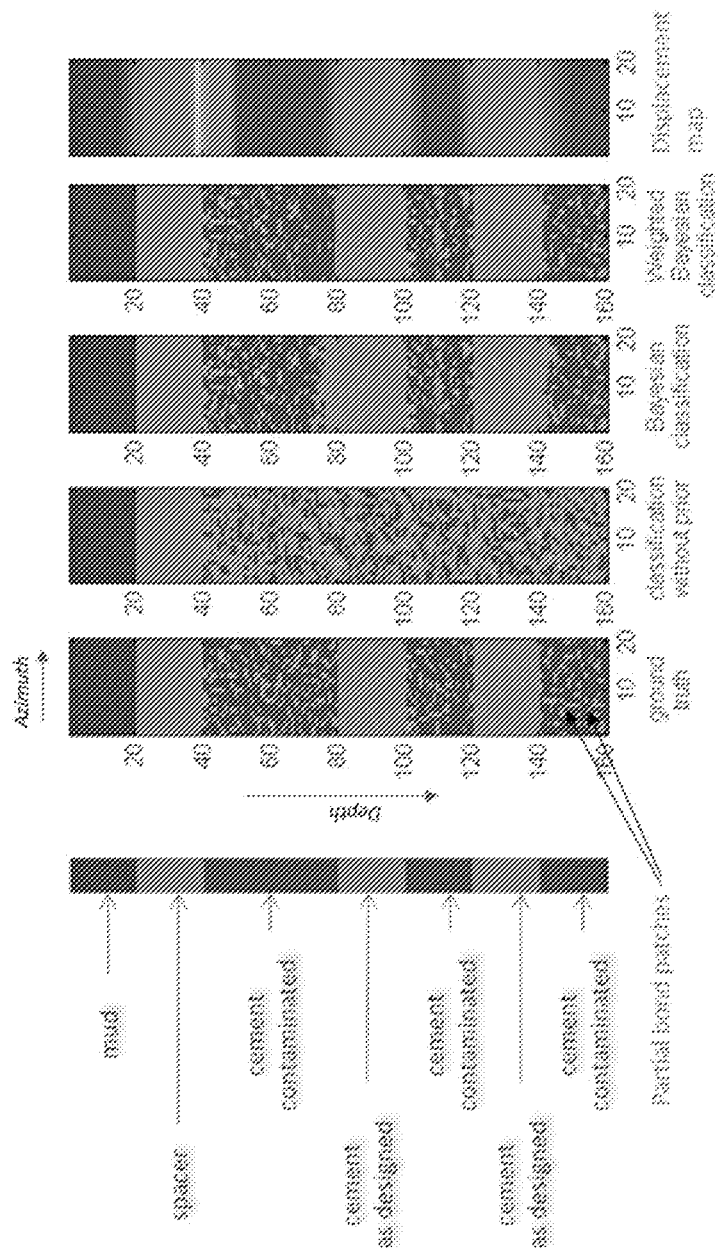
FIG. 12D illustrates an example of the application of the hierarchical Bayesian graphical model of FIGS. 11, 12A and 12B to a simulated dataset generated to cover a variety of combinations of different cements and fluids in the innermost annulus of a multiple casing string.

FIG. 12D illustrates an example of the application of the hierarchical Bayesian graphical model to a simulated dataset generated to cover a variety of combinations of different cements and fluids in the innermost annulus of a multiple casing string. FIG. 12D also highlights the capability of this framework to incorporate additional information as available. Specifically, in this example, the data is generated to simulate six possible states or classes of the innermost annulus: neat cement that is well-bonded to the casing, neat cement with partial-bond, contaminated cement well-bonded, contaminated cement with partial-bond, spacer behind casing, and mud behind casing. A forward model simulator can be used to generate the distribution for acoustic impedance and casing flexural attenuation for two typical ultrasonic measurements, namely the pulse echo and pitch catch as described above for given casing geometry and wellbore logging fluids. During the training stage, a number of samples were generated for each bonding condition and annular fill of the innermost annulus with the corresponding physical properties sampled from a mixture of Gaussian or gamma distributions as appropriate. These were used to learn or train the hierarchical Bayesian network to be used for classification. In this manner, the hierarchical Bayesian graphical model is trained using a forward model relating the properties of the innermost annulus to ultrasonic measurement outputs. The testing set was constructed using a proxy map for the true cement placement, as given by the leftmost panel, supplemented by randomly picking patches of partial bond condition leading to the 'ground truth' map shown in the second panel indicating cement placement and bond as a function of azimuth and depth. The rightmost panel incorporates the available prior knowledge of cement displacement map obtained, for example, from information about the cementing operation. The uncertainty in the placement is suitably encoded in probabilities for a specific fill that goes from low to high as we move away from the boundaries. The third panel shows a conventional naïve method based on thresholding without any use of priors. The fourth panel shows the use of a naïve Bayes classifier without the use of any spatial prior information as in the rightmost panel. Finally the fifth panel shows the use of the hierarchical Bayesian classifier incorporating the spatial placement priors of the rightmost panel. In this manner, the hierarchical Bayesian graphical model incorporates available spatial prior information pertaining to properties of the innermost annulus. One possible implementation uses a maximum likelihood estimator; alternatively more general kernel estimator (e.g. based on a two-dimensional Parzen window) could also be used. The benefit of the approach disclosed here is apparent in the match between the classified output and the ground truth. The approach is general and could also be trained for other and additional classes from other or additional measurements as appropriate.

Figure 13D:
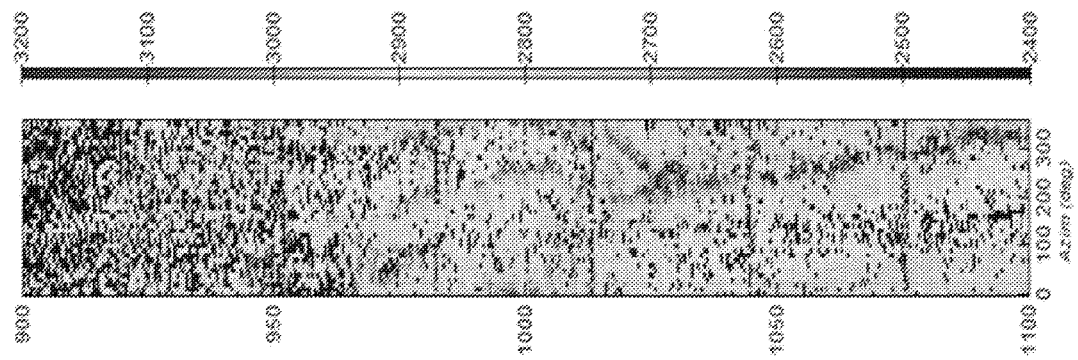
FIGS. 13A, 13B, 13C and 13D illustrate inner casing eccentering (with respect to outer casing).
Figure 13C:
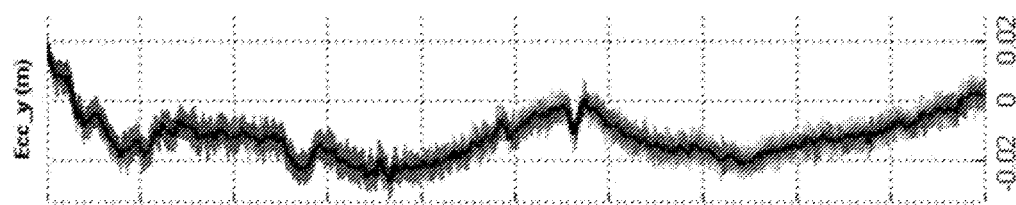
Figure 13B:
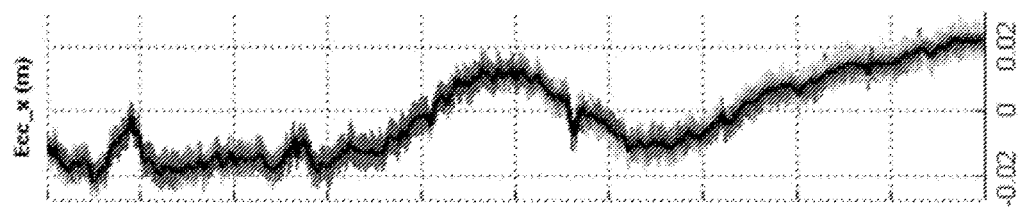
Figure 13A:
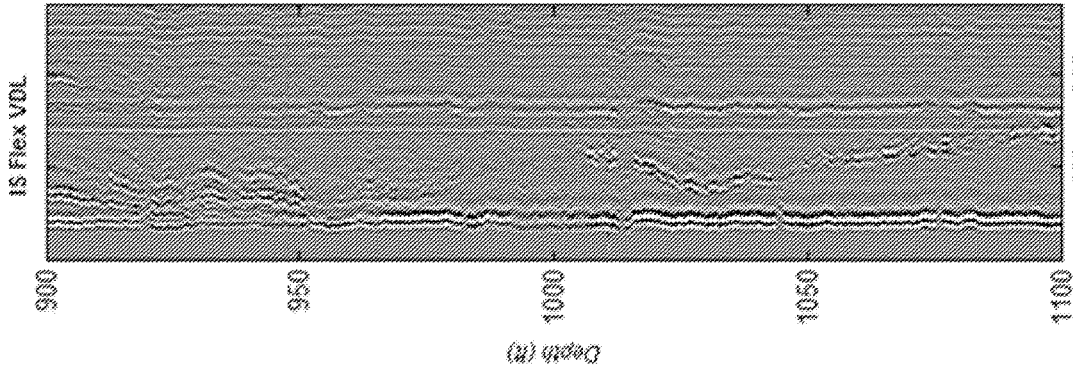

The inversion or interpretation of block 1007 can characterize the first casing eccentering (with respect to second casing) using the TIE obtained from the pitch-catch flexural signal of the ultrasonic logging tool. FIG. 13A shows an exemplary VDL image obtained from the pitch-catch flexural signal over a range of depths z by an ultrasonic logging tool. FIGS. 13B and 13C illustrate the magnitude of first casing eccentering (with respect to second casing) in the X and Y directions, respectively, using the TIE of the pitch-catch flexural signal over the range of depths z of FIG. 13A. The inversion or interpretation of block 1007 can also characterize compressional and shear velocities of the innermost annulus using attenuation dispersion as described in U.S. Patent Publ. No. 2015/0219780, incorporated by reference above in its entirety. FIG. 13D shows a cement compressional velocity map obtained using the attenuation dispersion. The inverted or interpreted quantities of block 1007 as applicable to the innermost annulus can be used to constrain the further interpretation of the least one outer annulus (and beyond) of the multiple string casing using the multimode inversion of block 1017 and the machine learning processing of block 1019 as described herein.

Note that casing eccentering when found to be significant can be used to activate the appropriate sonic models used for the classification and interpretation of the sonic data. Moreover the information on the innermost annulus state from the ultrasonic data is used to constrain the possible classification states when applied to the sonic data inference.

To support the machine learning processing of block 1019, the training of the machine learning classifier can be accomplished in a supervised fashion using modelled synthetic sonic data (computed with one or more modeling algorithms) and supplemented with real sonic data in the semi-supervised fashion. The training of the machine learning classifier can be posed as a classification problem, with the inputs being the phase and attenuation dispersion features indicative of various scenarios of annulus fill states and bonding states, and the outputs ("classes" or "labels") being the state of the annulus fill and bond. For example, the following classes (labels) can be used:

1. The innermost annulus (Annulus A) and the outer annulus (Annulus B) are cemented with a full bond to the casing and formation;
2. Annulus A is liquid, and Annulus B is cemented;
3. Annulus B is liquid, and Annulus A is cemented;
4. Both Annulus A and Annulus B are liquid-filled; and
5. Both Annulus A and Annulus B are cemented with a partial bond to (or detached from) the casing or the formation.

These classes can be defined for different formation types, such as super-fast, fast, medium and slow formations. In this manner, the classes are intended to encompass the range of possible sonic data that impact the identification of selected features. For example, the type of formation (slow vs fast vs super-fast) imposes constraints on the ranges of frequencies/slownesses in which to search for the distinguishing features as described below. Hence, this disclosure proposes to have features that are defined within a particular formation type, leading to a total of twenty classes. This framework can be extended to deal with partial bond cases in more detail by determining at which interface the disbond occurs.

The analysis of various cases can indicate a set of distinguishing features to be used for training. For example, a number of attributes in dispersions arising from a monopole excitation can indicate distinguishing features as follows:

For a liquid-filled state in Annulus A and/or Annulus B, an additional Stoneley mode appears, and each Stoneley mode has a specific shape indicative of whether the annulus A or the annulus B has a liquid-filled state;

For a liquid-filled state in both Annulus A and Annulus B, then two additional Stoneley modes are present;

For a liquid-filled state in Annulus A and/or Annulus B, a casing extensional mode is present; and Partial bond of Annulus A can be discriminated from the fully cemented case by detecting the casing extensional mode and is discriminated from the liquid-filled state in Annulus A by a lack of additional Stoneley mode for the Annulus A; and Partial bond of Annulus B can be discriminated from the fully cemented case by detecting the casing extensional mode and is discriminated from the liquid-filled state in Annulus B by a lack of an additional Stoneley mode for Annulus B.

In another example, a number of attributes in dispersions arising from a dipole excitation can indicate distinguishing features as follows:

existence, number, and shape of casing flexural modes, which are indicative of a liquid-filled state in Annulus A and/or Annulus B; and Many cut-off-modes, which additionally can help discriminate various partial bond scenarios for Annulus A and/or Annulus B.

Figure 14:
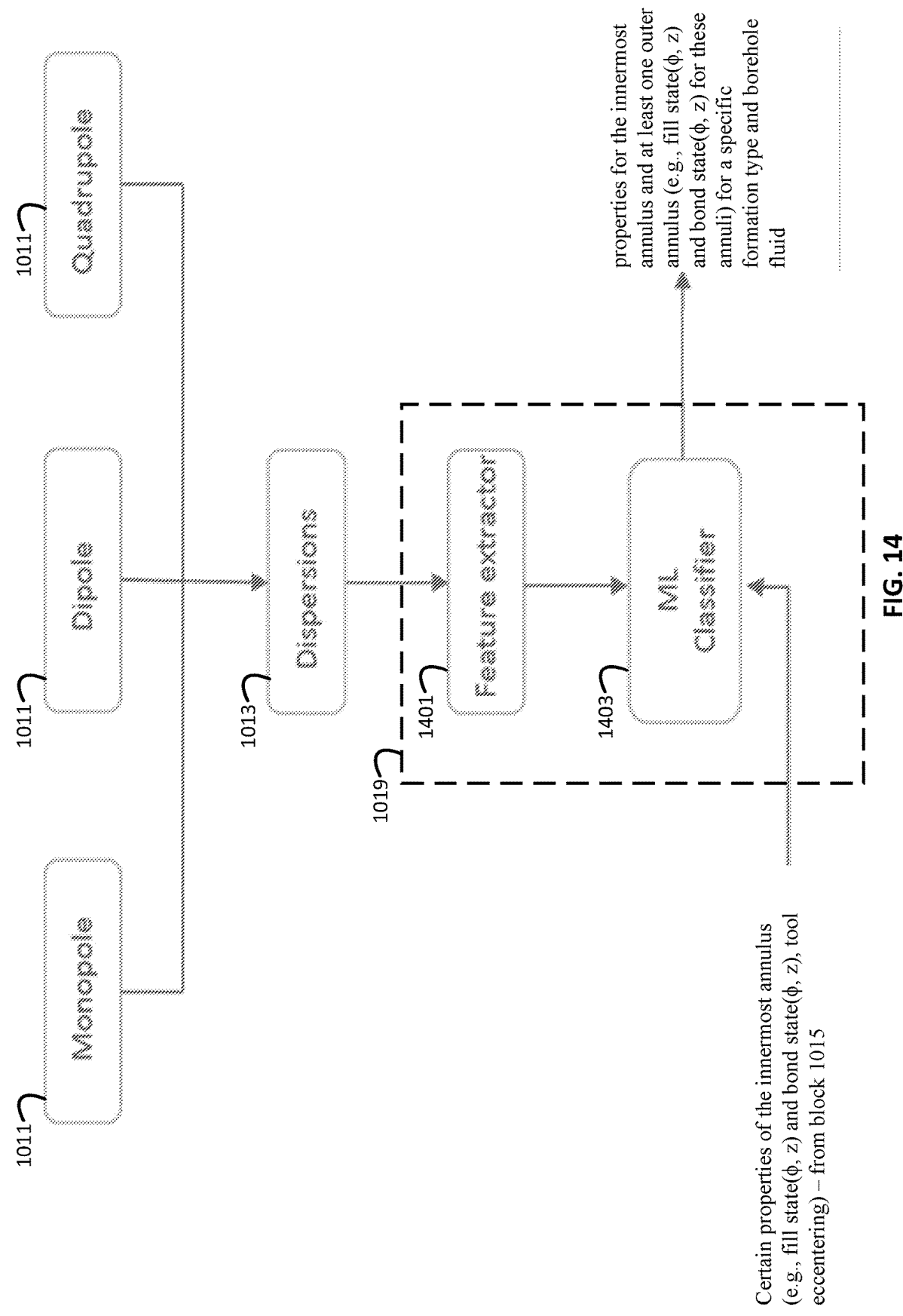
FIG. 14 shows a workflow for the integrated interpretation of the fill state and bond state of at least one outer annulus of a multiple casing string using machine learning processing.

FIG. 14 is a flow chart that shows details of an exemplary embodiment of the machine learning processing of block 1019 of FIG. 10, which operates on the multimode frequency dispersion attributes of block 1013 for the given azimuth direction $\phi$ and axial depth z. Block 1401 extracts or labels features of the multimode frequency dispersion attributes that are sensitive to the properties (such as the fill state and bond state) of the innermost annulus (Annulus A) and the outer annulus (Annulus B) of the multiple casing string for the given azimuth direction $\phi$ and axial depth z. The extracted features are supplied to the trained machine learning classifier (block 1403), which operates in an unsupervised fashion to output the classes that correspond to such features. The classes output by the trained classifier pertain to properties (such as the fill state and bond state) of the innermost annulus (Annulus A) and the outer annulus (Annulus B) of the multiple casing string for the given azimuth direction $\phi$ and axial depth z for the specific formation type as investigated by the ultrasonic and sonic logging tools. The operation of the machine learning classifier of block 1403 can use certain properties of the innermost annulus (e.g., fill state($\phi$, z), bond state($\phi$, z), and tool eccentering) output from block 1015 as inputs.

Figure 15:
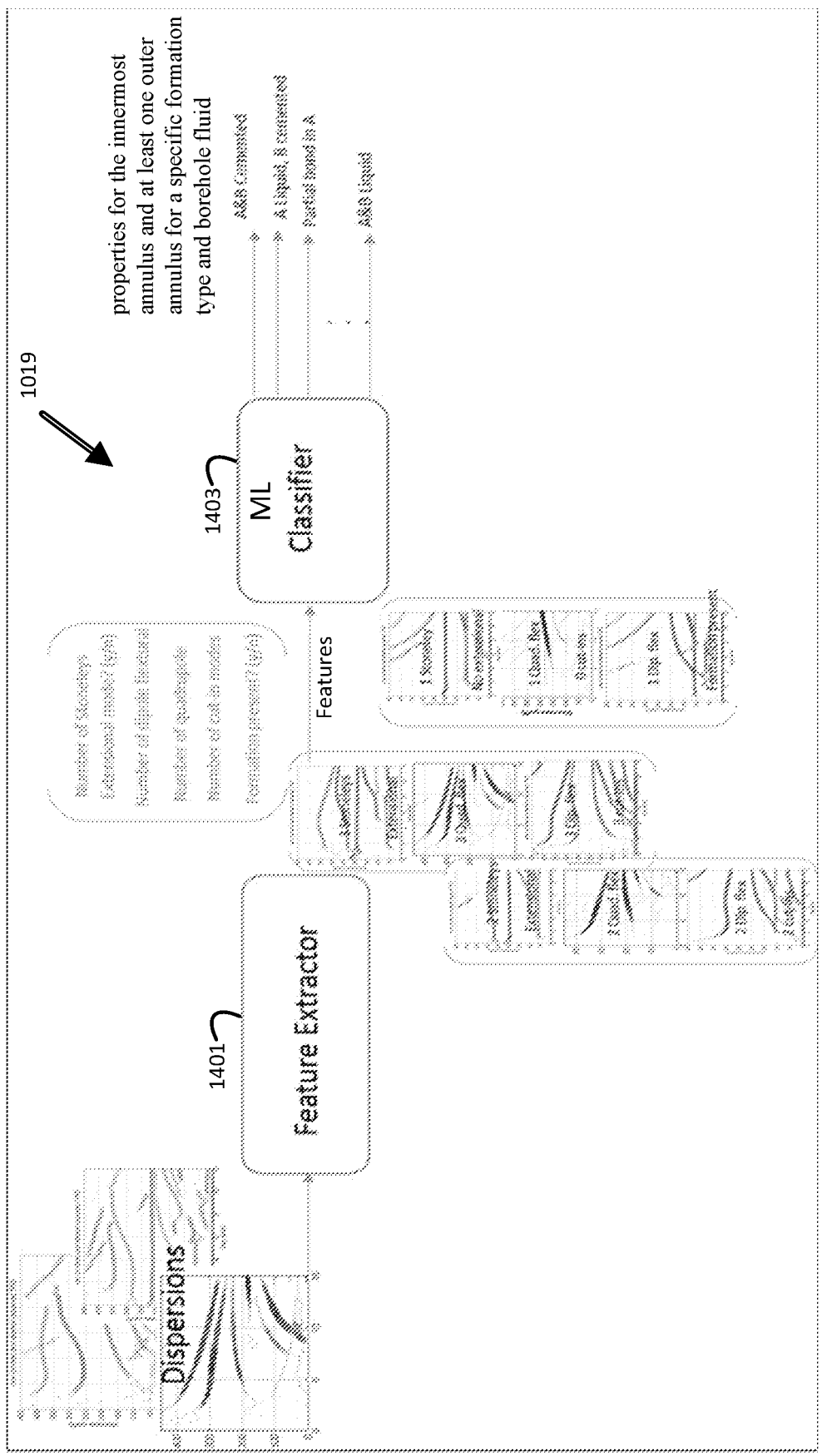
FIG. 15 shows the machine learning processing of FIG. 14, including the extraction of relevant features extracted from dispersions of sonic data and their use in a classifier to identify the fill states and bond states for both the innermost annulus and at least one outer annulus of the multiple casing string.

The operation of the machine learning classifier of block 1403 can be trained using a rich database of modeled (synthetic) examples, covering a range of formation/cement/casing properties observed in practice as shown FIGS. 15, 16A, 16B, 17A, 17B and 18. Training can be accomplished by a number of machine learning algorithms in the literature, such as described in Barber, D., "Bayesian Reasoning and Machine Learning," Cambridge University Press, 2012. Note that the effects of the fill and bond states of the annuli A and B on the phase and attenuation dispersion characteristics of the multimode sonic data can be modeled and a set of representative examples included in the training step. Note that the machine learning classifier is data driven and appropriate for more complex cases such as in our proposed application. Furthermore, the machine learning classifier can encompass both discriminative and generative models that can be learnt from data in supervised (labelled classes), semi-supervised (partially labelled) and unsupervised settings. In this manner, the data driven approach of the machine learning classifier is more general than the use of model-based Bayesian inversion using forward models, which is applicable only when enough information is available to use the appropriate forward models. Furthermore, the graphs of the dispersions and features in FIG. 15 are schematic in nature with details that are not necessary to convey the workflow as depicted in the figure.

Figure 16A:
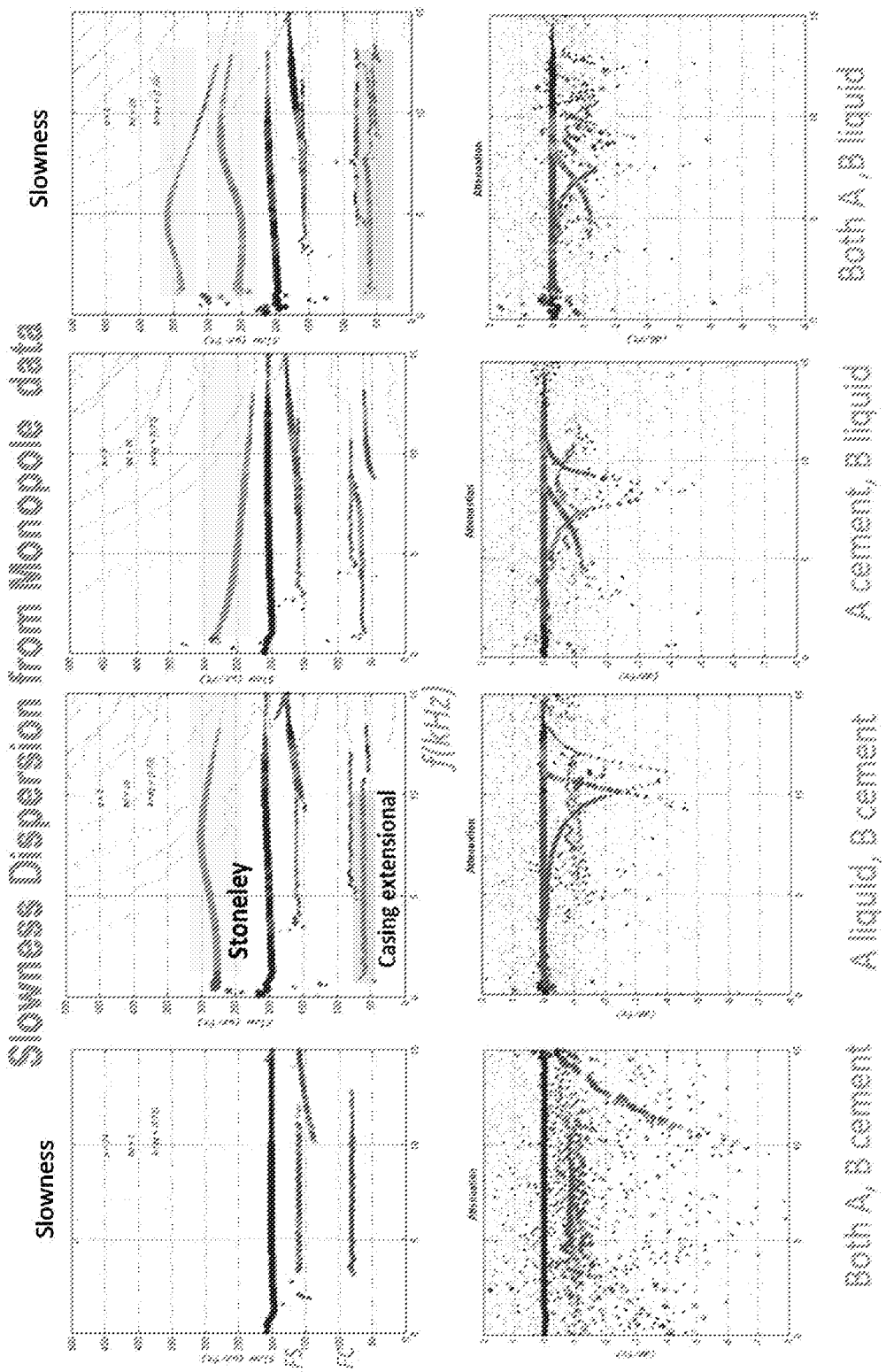
FIG. 16A shows the phase dispersion characteristics (upper row plots) and attenuation dispersion characteristics (lower row plots) arising from a monopole excitation for a dual casing string within a fast formation with different fill states in an innermost annulus and an outer annulus of the dual casing string.
Figure 16B:
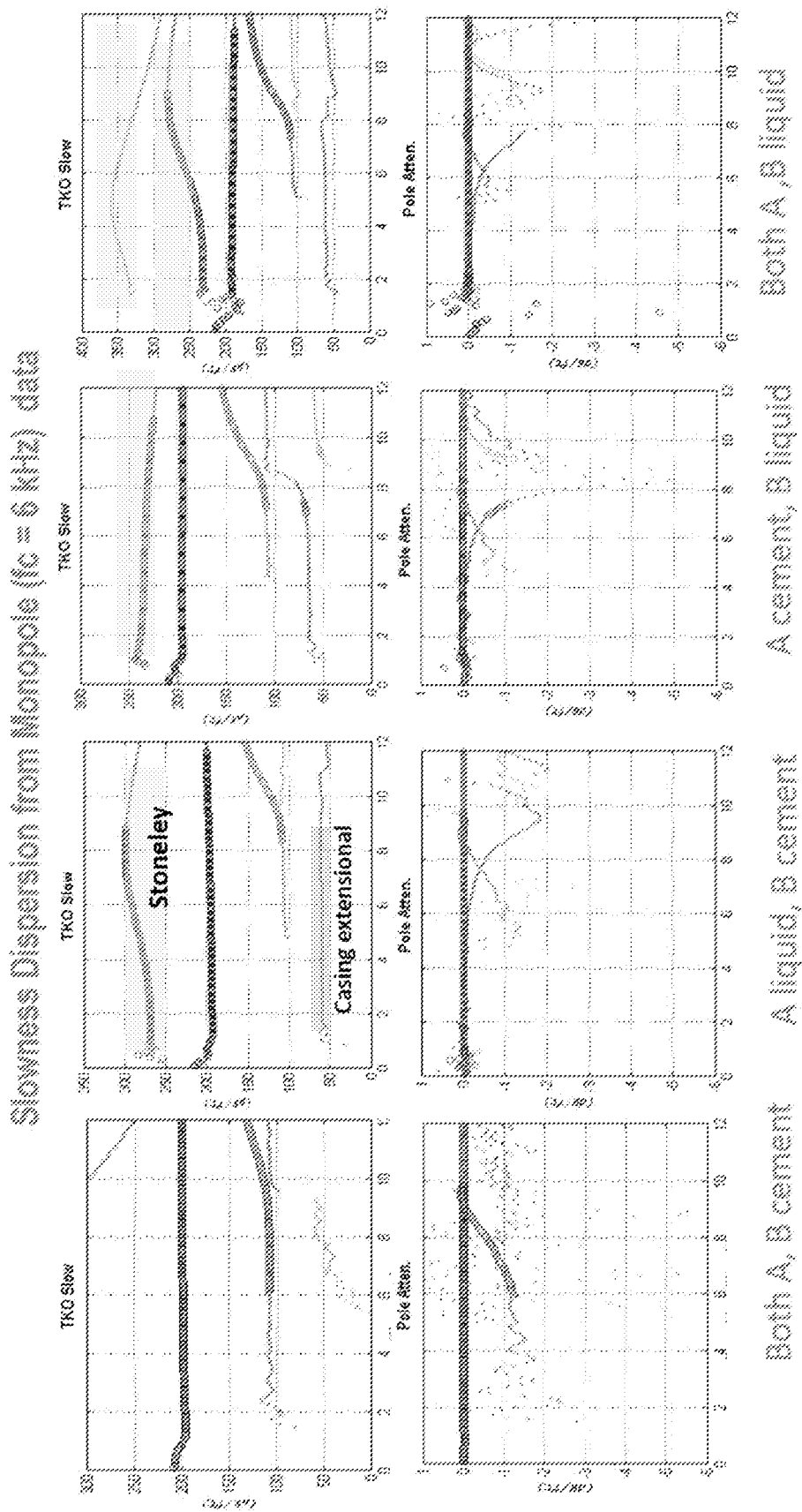
FIG. 16B shows the phase dispersion characteristics (upper row plots) and attenuation dispersion characteristics (lower row plots) arising from a monopole excitation for a dual casing string within a super-fast formation with different fill states in an innermost annulus and an outer annulus of the dual casing string.
Figure 16C:
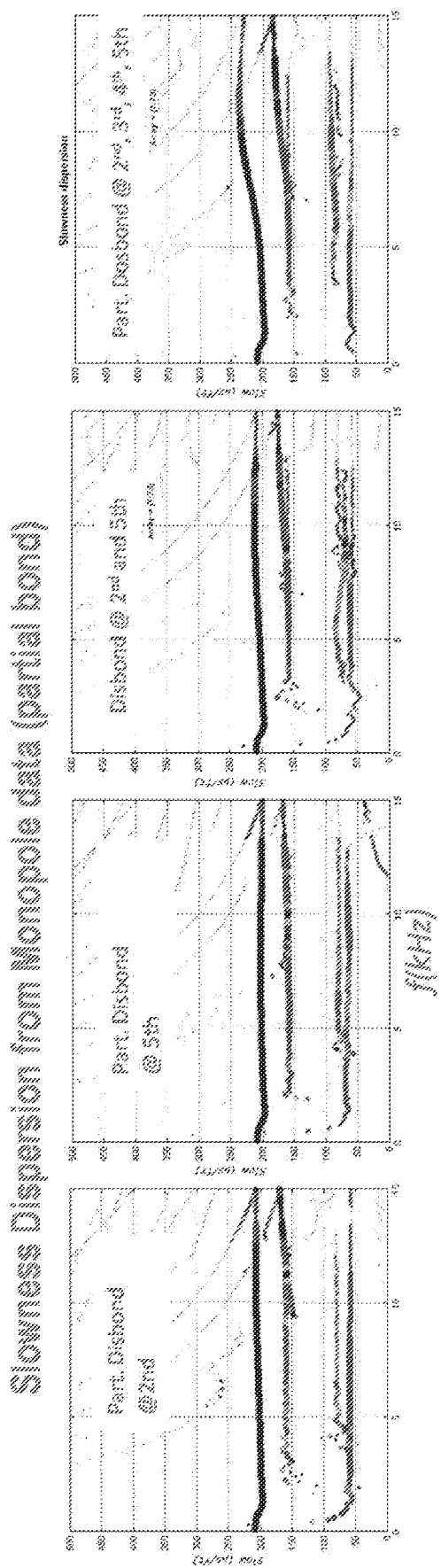
FIG. 16C illustrates the slowness dispersions arising from a monopole excitation for a dual casing string with a partial bond at various interfaces.

The upper row plots of FIG. 16A show the phase dispersion characteristics arising from a monopole excitation in a dual string casing within a fast formation (DTC=80 us/ft) for different fill states of annuli A and B. The lower row plots of FIG. 16A show the attenuation dispersion characteristics arising from a monopole excitation in a dual string casing within a fast formation (DTC=80 us/ft) for different fill states of annuli A and B. The upper row plots of FIG. 16B show the phase dispersion characteristics arising from a monopole excitation in a dual string casing within a super-fast formation (DTC=62 us/ft) for different fill states of annuli A and B. The lower row plots of FIG. 16B show the attenuation dispersion characteristics arising from a monopole excitation in a dual string casing within a super-fast formation (DTC=62 us/ft) for different fill states of annuli A and B. Note the differences in the number of Stoneley modes and the appearance of casing extensional mode in the event of one annulus not being cemented. Finally, FIG. 16C illustrates the slowness dispersions arising from a monopole excitation in a dual string casing with a partial bond at various interfaces. These can be used for training the classifiers.

Figure 17B:
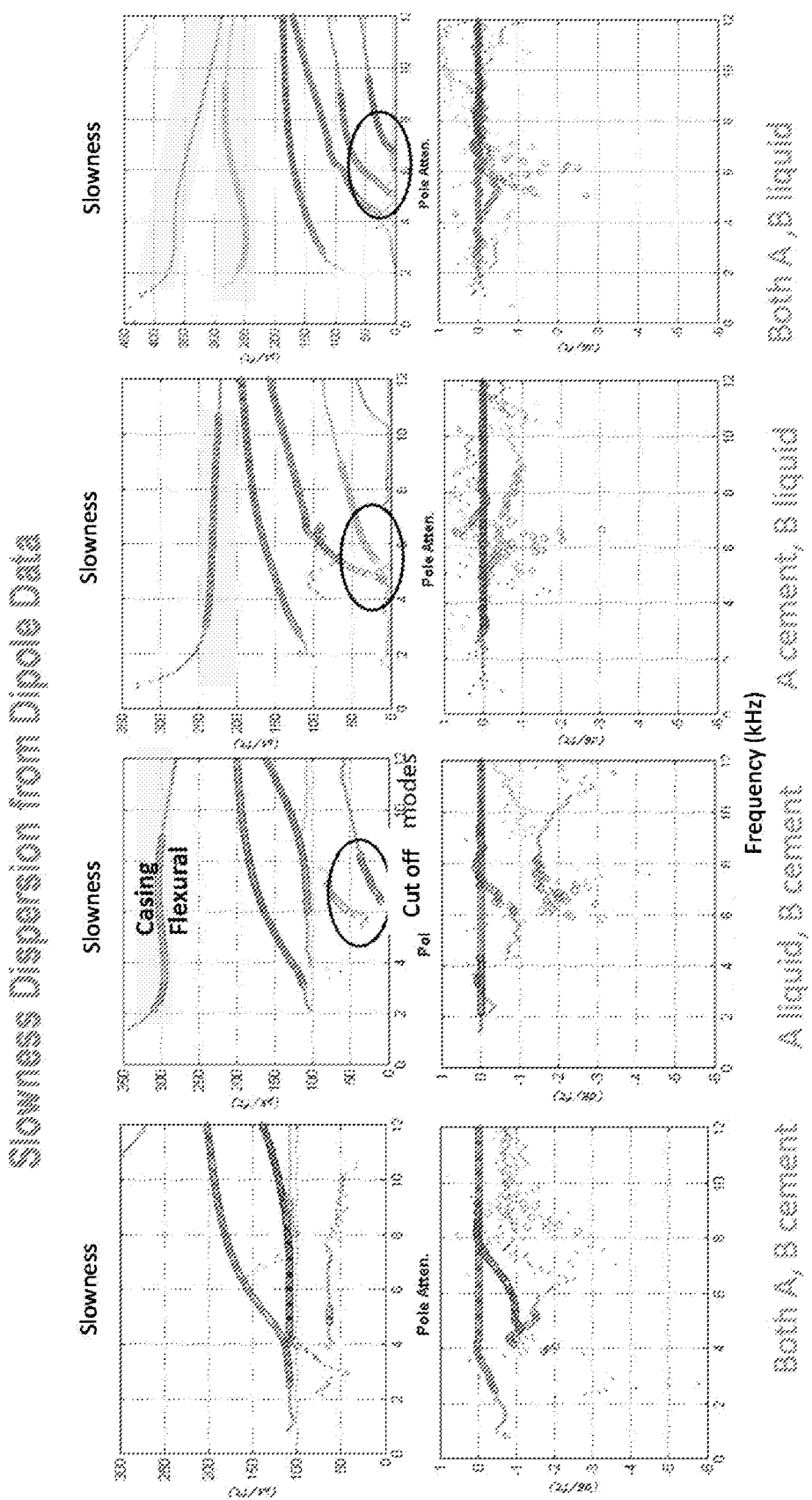
FIG. 17B shows the phase dispersion characteristics (upper row plots) and attenuation dispersion characteristics (lower row plots) arising from a dipole excitation for a dual casing string within a super-fast formation with different fill states in an innermost annulus and an outer annulus of the dual casing string.
Figure 17C:
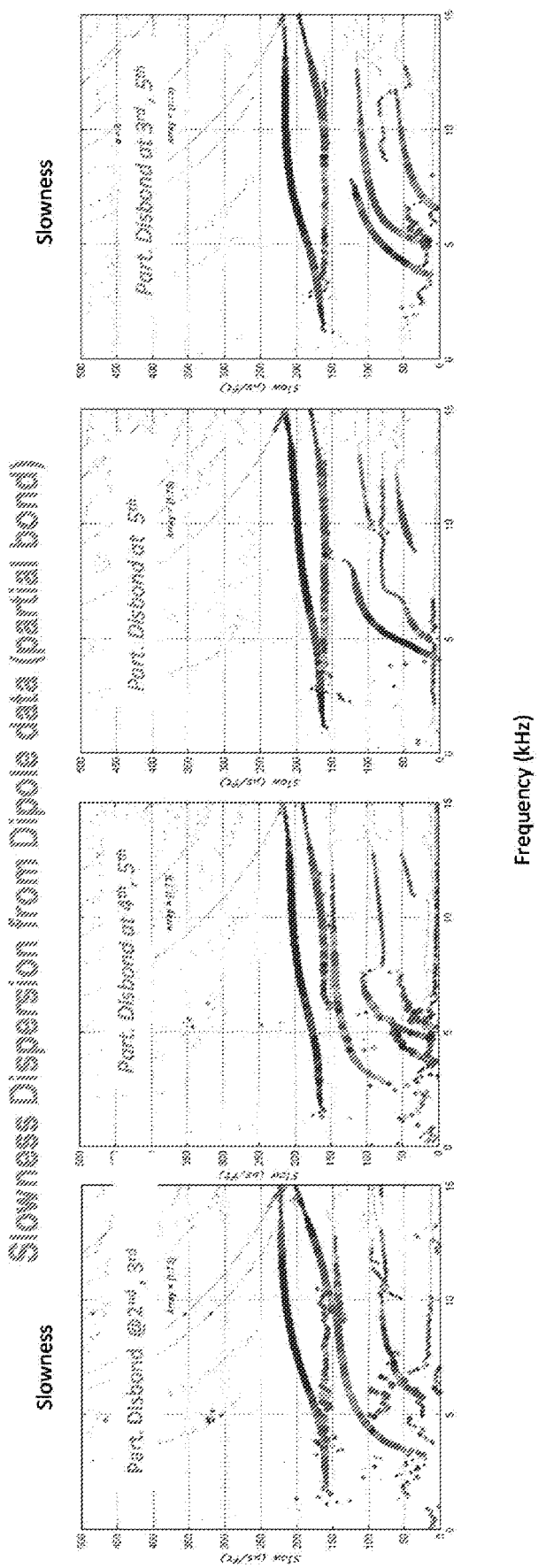
FIG. 17C illustrates the slowness dispersions arising from a dipole excitation for a dual casing string with a partial bond at various interfaces.

The upper row plots of FIG. 17A show the phase dispersion characteristics arising from a dipole excitation in a dual string casing within a fast formation (DTC=80 us/ft) for different fill states of annuli A and B. The lower row plots of FIG. 17A show the attenuation dispersion characteristics arising from a dipole excitation in a dual string casing within a fast formation (DTC=80 us/ft) for different fill states of annuli A and B. The upper row plots of FIG. 17B show the phase dispersion characteristics arising from a dipole excitation in a dual string casing within a super-fast formation (DTC=62 us/ft) for different fill states of annuli A and B. The lower rowplots of FIG. 17B show the attenuation dispersion characteristics arising from a dipole excitation in a dual string casing within a super-fast formation (DTC=62 us/ft) for different fill states of annuli A and B. Finally, FIG. 17C illustrates the slowness dispersions arising from a dipole excitation in a dual string casing with a partial bond at various interfaces.

Figure 18:
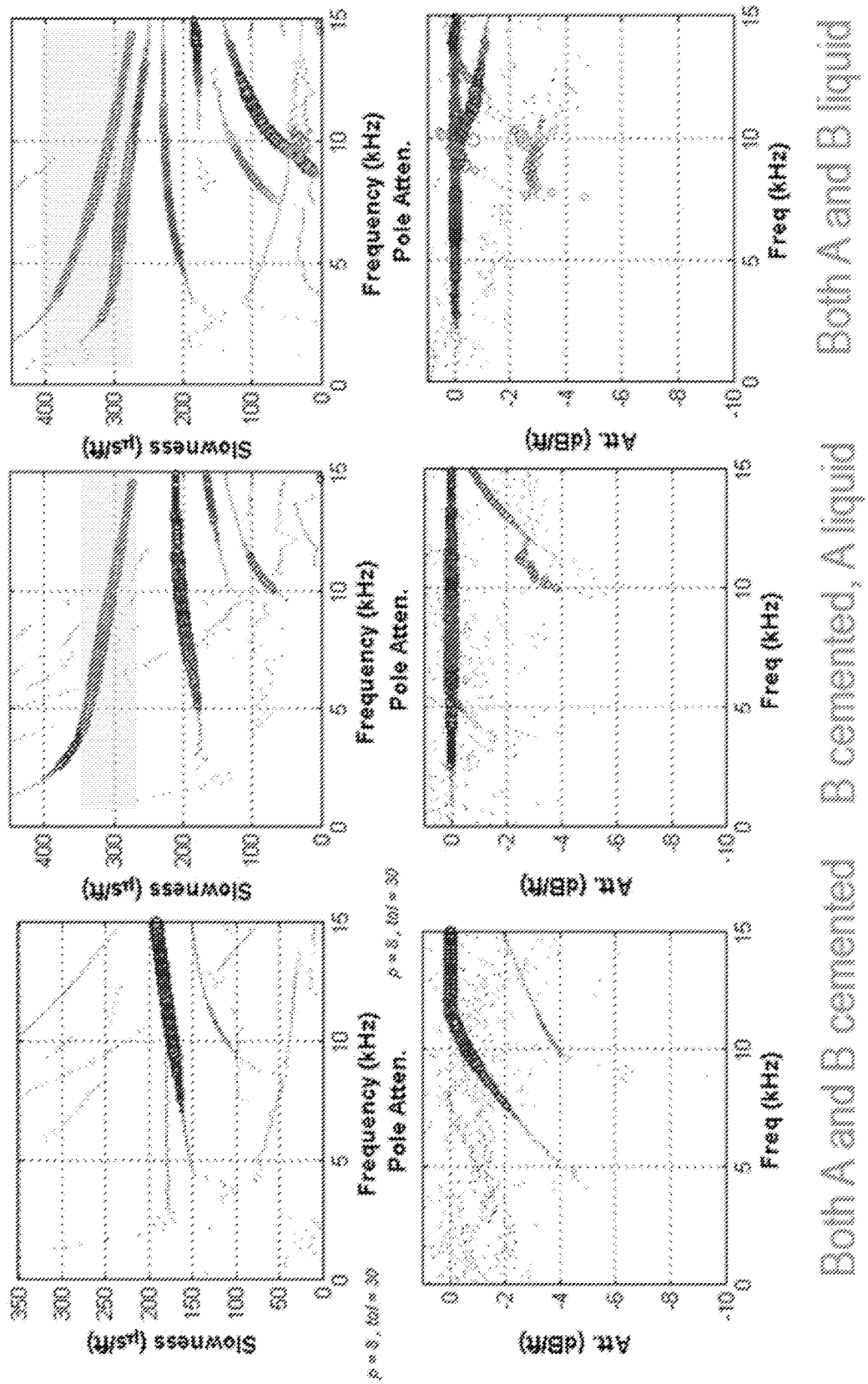
FIG. 18 shows the phase dispersion characteristics (upper row plots) and attenuation dispersion characteristics (lower row plots) arising from a quadrapole excitation for a dual casing string for different fill states in an innermost annulus and an outer annulus of the dual casing string.

The upper row plots of FIG. 18 show the phase dispersion characteristics arising from a quadrupole excitation in a dual string casing for different fill states of annuli A and B. The lower row plots of FIG. 18 show the attenuation dispersion characteristics arising from a quadrupole excitation in a dual string casing for different fill states of annuli A and B. Note the differences in the number of quadrupole flexural modes.

Figure 19:
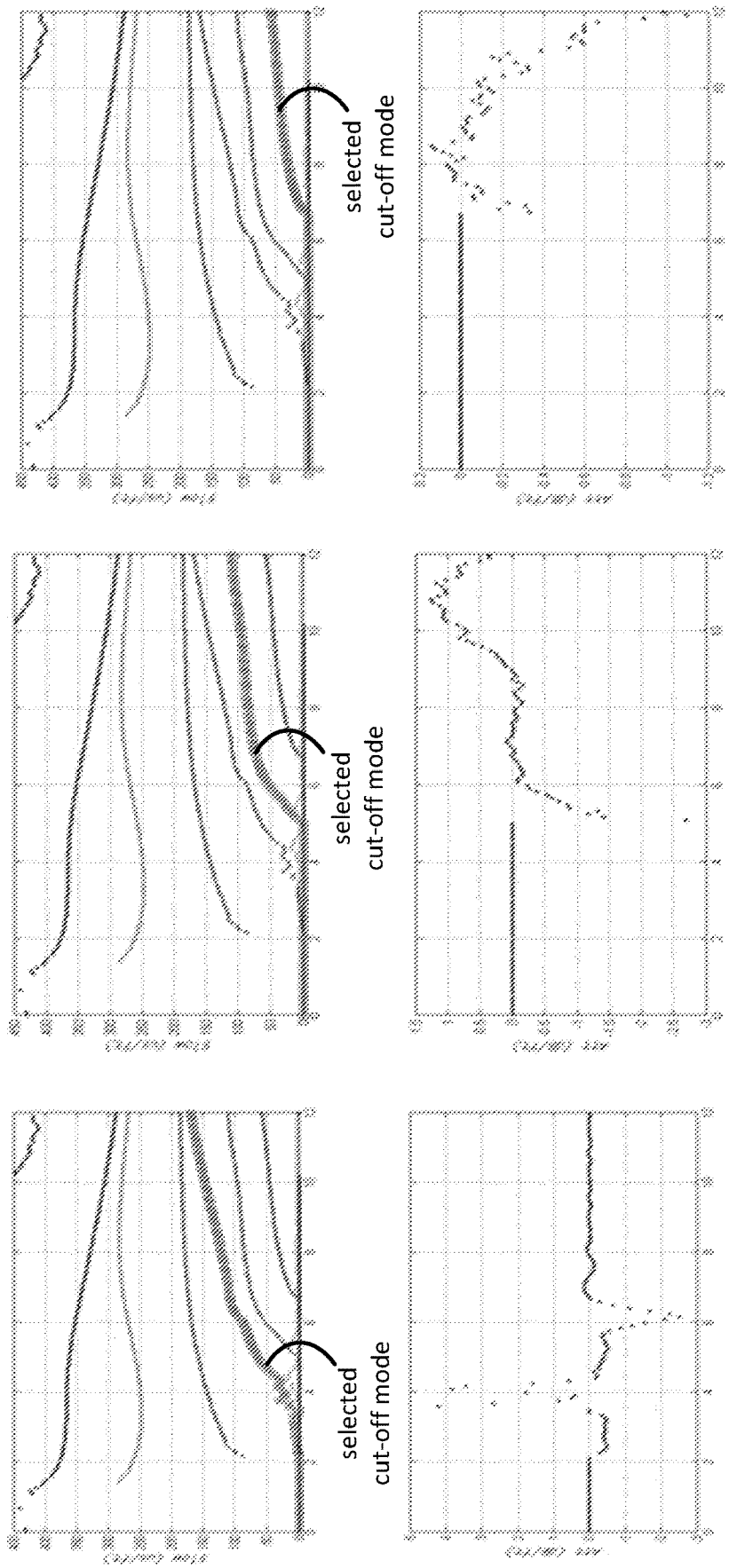
FIG. 19 shows the attenuative nature of cut-off modes. The first row plots highlights phase dispersion of a selected cut-off mode, and the second row plots shows their respective attenuation dispersions.

FIG. 19 shows plots that include cut-off modes. The upper plots of FIG. 19 show phase dispersion of a selected cut-off mode, and the lower plots of FIG. 19 show their respective attenuation dispersions. Cut-off modes typically approach zero slowness at specific cut-off frequencies and show significant attenuations, This characteristic allows the cut-off modes to be discriminated from aliasing artifacts of other strong wellbore modes. The cutoff modes are excited when one or more annuli are filled with fluid or light cement fill and their presence can be used as a diagnostic to distinguish fluid or light cement fill from cases of hard cement fill.

Figure 20:
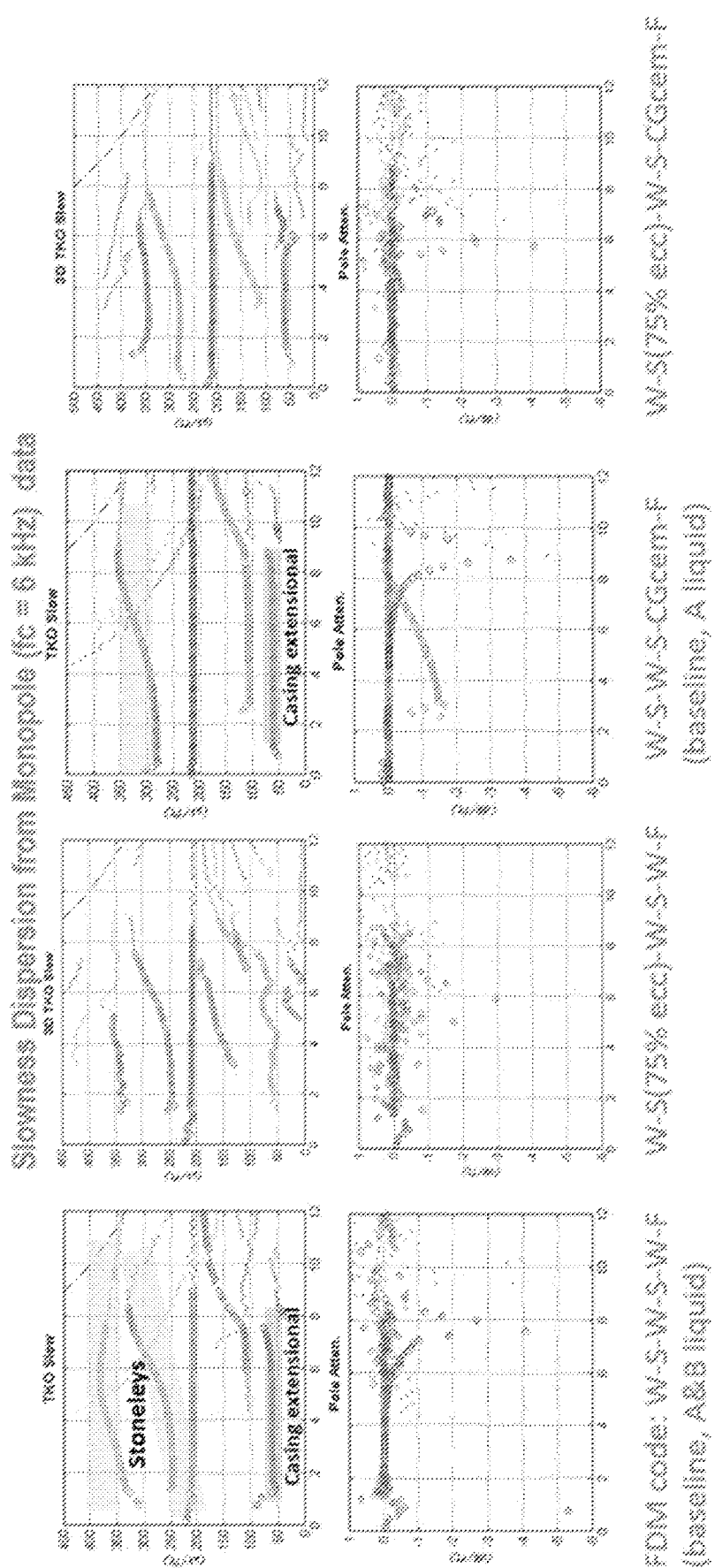
FIG. 20 shows the phase dispersion characteristics (upper row plots) and attenuation dispersion characteristics (lower row plots) arising from a monopole excitation for for a dual casing string in a super-fast formation with 75% eccentering of inner casing with respect to the outer casing for two baseline cases and two different fill states in an innermost annulus and an outer annulus of the dual casing string.
Figure 21:
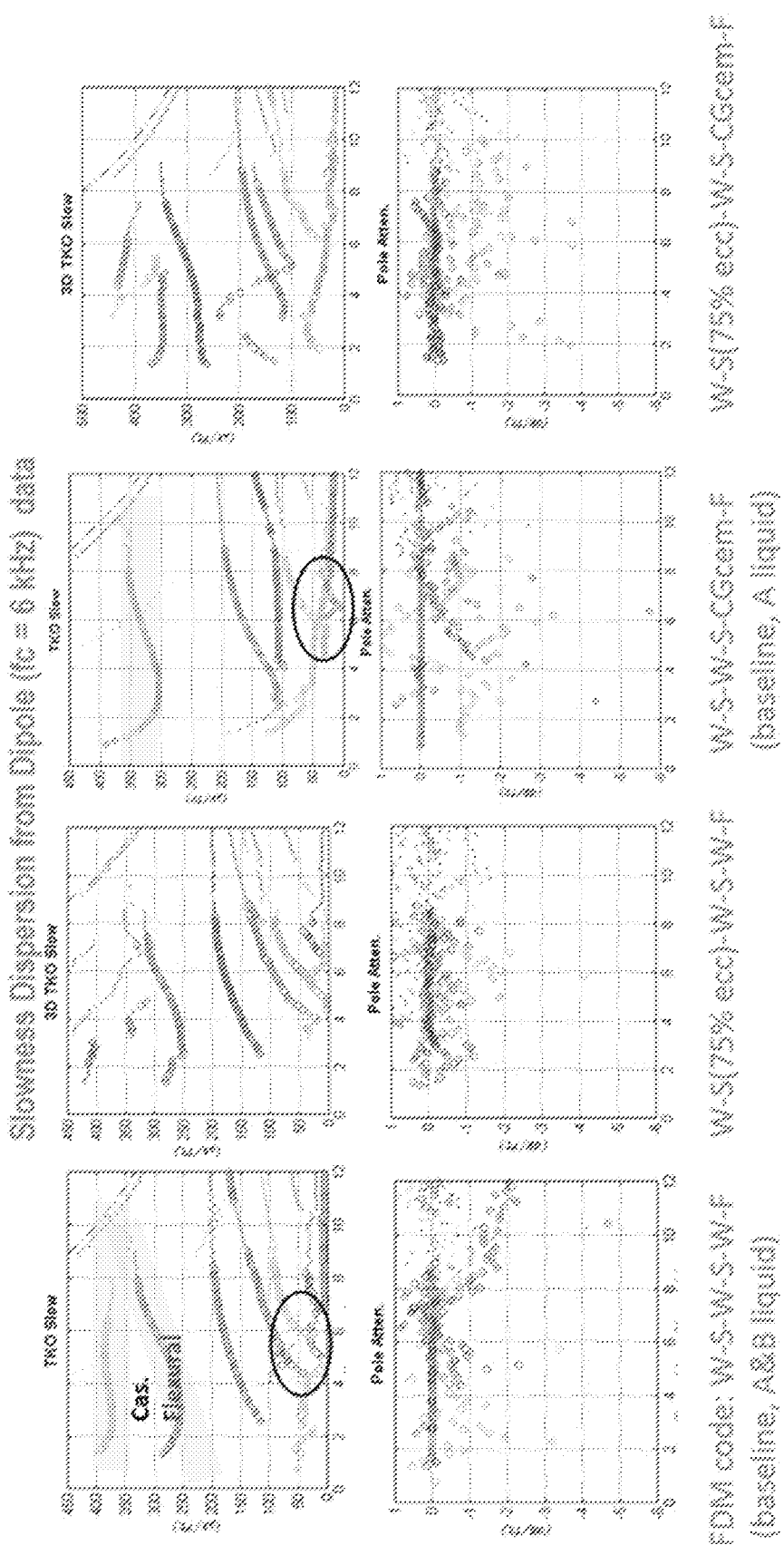
FIG. 21 shows the phase dispersion characteristics (upper row plots) and attenuation dispersion characteristics (lower row plots) arising from a dipole excitation for a dual casing string in a super-fast formation with 75% eccentering of inner casing with respect to the outer casing for two baseline cases and two different fill states in an innermost annulus and an outer annulus of the dual casing string.

The training of the machine learning classifier of block 1403 can also account for the effect of casing eccentering on phase and attenuation dispersion characteristics of the sonic data. The upper plots of FIG. 20 show the phase dispersion characteristics arising from a monopole excitation in a dual string casing within a super-fast formation for four cases (from left to right): (i) a baseline case where both Annulus A and Annulus B have a fill state of "liquid-filled," (ii) a case where both Annulus A and Annulus B have a fill state of "liquid-filled" with 75% eccentering of the first casing with respect to the second casing, (iii) a baseline case where annulus A has a fill state of "liquid-filled" and annulus B has a fill state of "cemented," and (iv) a case where annulus A has a fill state of "liquid-filled" and annulus B has a fill state of "cemented" with 75% eccentering of the first casing with respect to the second casing. The lower plots of FIG. 20 show the attenuation dispersion characteristics arising from a monopole excitation in a dual string casing within a super-fast formation for the same four cases (from left to right) as the upper plots. The upper plots of FIG. 21 show the phase dispersion characteristics arising from a dipole excitation in a dual string casing within a super-fast formation for the same four cases (from left to right) as the plots of FIG. 20. The lower plots of FIG. 21 show the attenuation dispersion characteristics arising from a monopole excitation in a dual string casing within a super-fast formation for the same four cases (from left to right) as the plots of FIG. 20. Note that the effects of casing eccentering on the phase and attenuation dispersion characteristics of the sonic data can also be modeled and a set of representative examples included in the training step. Data sets incorporating perturbations in compressional and shear velocities for each of the formation types as well as noise to cover imperfectly modeled data in realistic acquisitions can also be included. The machine learning classifier of block 1403 can also be validated and tested on the field data derived from ultrasonic and sonic logging tools (in an unsupervised manner), and on perturbed modelled data (in semi-supervised manner).

The features (or feature vectors) that are extracted from the multimode sonic data (block 1401) can be extracted from modelled data and used to train the machine learning classifier. In one embodiment, such features (or feature vectors) can include dispersion attributes arising from the excitation from any or all of three sources (monopole, dipole, quadrupole), and may consist of the following entries:
    a. For a monopole excitation (see FIGS. 16A and 16B)
        i. Number of Stoneley modes: the appearance of one additional Stoneley mode is a clear indicator of annulus A or annulus B being liquid-filled, and the appearance of two additional Stoneley modes indicates that both annuli A and B are liquid-filled;
        ii. Number of Casing Extensional modes: the existence of a casing extensional mode is indicative of either a partial bond for annulus A or B or annulus A or B being liquid-filled; and
        iii. The partial bond of annulus A or B can be discriminated from the fully cemented case by detecting the casing extensional mode and is discriminated from the liquid fill state in annulus A or B by the lack of additional Stoneley modes.
    b. For a dipole excitation (See FIGS. 17A and 17B):
        i. Number of dipole flexural modes.
        ii. Number of cut-off modes.
        iii. Presence of formation modes.
    c. For a quadrupole excitation (See FIG. 18):
        i. Number of quadrupole modes.

The feature vectors can also include slowness and attenuation dispersion characteristics of the modes present for one or more of the different excitations.

Note that the attenuation dispersion is sensitive to the parameters of interest and key to identifying the correct features from the dispersions. For example, true cut-off modes have significant attenuation since their phase slowness is faster than the formation as is evident from FIG. 19. Therefore, comparing the attenuation to a threshold can provide for reliable detection of the cut-off modes among potential aliasing artifacts in realistic scenarios.

The ultrasonic and sonic data used in the method described herein can be collected using a wellbore logging tool, such as a wireline logging tool. Other wellbore tools and wellbore tool configurations can also be used to acquire the ultrasonic and sonic data. For example, the wireline logging tool can be conveyed by other means, such as coiled tubing. Furthermore, ultrasonic and sonic data can be acquired using other wellbore logging tools, such as logging-while-drilling (LWD) tools.

The methodology described herein for analyzing cement integrity in a casing string can be performed by a processing system. Furthermore, the inversion and the machine learning processing described above can be implemented using a processing system. The processing system is not limited to any particular device type or system. The processing system may be a computer, such as a laptop computer, a desktop computer, or a mainframe computer. The processing system may include a graphical user interface (GUI) so that a user can interact with the processing system. The processing system may also include one or more processors (e.g., microprocessors, microcontrollers, digital signal processors, or general purpose computers) for executing any of the methods and processes described above. Such processors may be interconnected over a network, such as the Internet.

The processing system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Any of the methods and processes described above can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure.

The invention claimed is:

1. A method for analyzing cement integrity in a depth interval of a cased wellbore traversing a formation, wherein the cased wellbore includes a multiple string casing with an innermost annulus disposed inside at least one outer annulus, the method comprising:
   (i) processing ultrasonic data obtained from ultrasonic measurements on the depth interval of the wellbore to determine properties of the innermost annulus;
   (ii) processing sonic data obtained from sonic measurements on the depth interval of the wellbore to extract features of the sonic data;
   (iii) determining properties of the innermost annulus disposed between an innermost casing and a surrounding casing and the least one outer annulus using machine learning processing, wherein the properties of the innermost annulus and the least one outer annulus include at least one property characterizing state of material in the innermost annulus and at least one property characterizing state of material in the at least one outer annulus, and wherein the features of the sonic data from process (ii) are inputs to the machine learning processing;
   (iv) analyzing the cement integrity based on the determined properties.

2. The method of claim 1, further comprising:
   storing the properties of the innermost annulus as determined in process (i) and the properties of the innermost annulus and the at least one outer annulus as determined in process (iii) in computer-readable storage media for analysis of the cement integrity in the interval of the wellbore.

3. The method of claim 1, wherein the machine learning processing of process (iii) uses the properties of the innermost annulus of process (i) as a constraint in the determination of the properties of the innermost annulus and the at least one outer annulus.

4. The method of claim 1, wherein the machine learning processing comprises a machine learning classifier.

5. The method of claim 4, further comprising:
   training the machine learning classifier for a variety of anticipated conditions of the innermost annulus and the at least one outer annulus in different formation types and wellbore fluids.

6. The method of claim 5, wherein the training of the machine learning classifier uses at least one of: (a) synthetic sonic data generated using modelled data with perturbations and noise; and (b) field data.

7. The method of claim 5, further comprising:
   validating the machine learning classifier using field data and synthetic data.

8. The method according to claim 1, wherein:
   the properties of the innermost annulus and the at least one outer annulus include fill states for both the innermost annulus and the at least one outer annulus; and
   the fill states represent one of a solid, liquid, and gas phase of the material of the innermost annulus and the at least one outer annulus.

9. The method according to claim 1, wherein:
   the properties of the innermost annulus include bond state for the innermost annulus for the case of solid fill state for the innermost annulus;
   the properties of the at least one outer annulus include bond state for the at least one outer annulus for the case of solid fill state for the at least one outer annulus; and
   the bond state for the innermost annulus or the at least one outer annulus characterizes interfacial conditions of cement to casing bonding or cement to formation bonding.

10. The method according to claim 1, wherein the machine learning processing determines properties of both the innermost annulus and the at least one outer annulus that correspond to the features of the sonic data from process (ii).

11. The method according to claim 1, wherein the features comprise specific attributes of slowness and attenuation dispersions of the sonic data.

12. The method according to claim 11, wherein the sonic data arises from at least one of a monopole excitation, a dipole excitation, and a quadrupole excitation.

13. The method according to claim 12, wherein the attributes comprise at least one of:
   (a) a number of Stoneley modes arising from a monopole excitation;
   (b) a number of casing extensional modes arising from a monopole excitation;
   (c) a number of dipole flexural modes arising from a dipole excitation;
   (d) a number of cut-off modes arising from a dipole excitation;
   (e) presence of formation modes arising from a dipole excitation;
   (f) a number of quadrupole modes arising from a quadrupole excitation; and
   (g) slowness and attenuation dispersion characteristics of the modes present.

14. The method of claim 1, wherein the ultrasonic measurements include ultrasonic pulse echo and pitch-catch measurements.

15. The method of claim 14, wherein process (i) comprises performing an inversion of the ultrasonic data to determine the properties of the innermost annulus.

16. The method of claim 15, wherein the properties determined by the inversion of the ultrasonic data comprise at least one of:
   (a) compressional wavespeed $V_p$ as a function of azimuth direction $\phi$ and axial depth $z$;
   (b) shear wavespeed $V_s$ as a function of azimuth direction $\phi$ and axial depth $z$;
   (c) density $\rho$ as a function of azimuth direction $\phi$ and axial depth $z$;
   (d) acoustic impedance $Z$ as a function of azimuth direction $\phi$ and axial depth $z$;
   (e) bond parameters as a function of azimuth direction $\phi$ and axial depth $z$;
   (f) bond state as a function of azimuth direction $\phi$ and axial depth $z$;
   (g) annulus fill state as a function of azimuth direction $\phi$ and axial depth $z$; and
   (h) a measure of casing eccentering as a function of axial depth $z$.

17. The method of claim 15, wherein the inversion of the ultrasonic data employs a hierarchical Bayesian graphical model to determine certain properties of the innermost annulus.

18. The method of claim 17, wherein the certain properties include the fill state and bond state for the innermost annulus.

19. The method of claim 17, wherein the hierarchical Bayesian graphical model is trained using a forward model relating the properties of the innermost annulus to ultrasonic measurement outputs.

20. The method of claim 17, wherein the hierarchical Bayesian graphical model incorporates available spatial prior information pertaining to properties of the innermost annulus.

21. The method of claim 1, further comprising:
(iv) processing sonic data obtained from sonic measurements on the depth interval of the wellbore in order to determine properties of the at least one outer annulus.

22. The method of claim 21, wherein process (iv) comprises performing an inversion of the sonic data to determine the properties of the least one outer annulus.

23. The method of claim 22, wherein the properties identified by the inversion of the sonic data comprise at least one of:
(a) compressional wavespeed $V_p$ as a function of azimuth direction $\phi$ and axial depth z;
(b) shear wavespeed $V_s$ as a function of azimuth direction $\phi$ and axial depth z;
(c) density $\rho$ as a function of azimuth direction $\phi$ and axial depth z;
(e) acoustic impedance Z as a function of azimuth direction $\phi$ and axial depth z; and
(f) bond parameters as a function of azimuth direction $\phi$ and axial depth z.

24. The method of claim 22, wherein the inversion of the sonic data of process (iv) uses the properties of the innermost annulus of process (i) as a constraint in the determination of the properties of the at least one outer annulus.

25. The method of claim 21, further comprising:
storing the properties of the least one outer annulus as determined in process (iv) in computer-readable storage media for analysis of the cement integrity in the interval of the wellbore.

26. A system for analyzing cement integrity in a cased wellbore traversing a formation, wherein the cased wellbore includes a multiple string casing with an innermost annulus disposed inside at least one outer annulus, the system comprising:
a sonic tool configured to generate waveforms that travel into the casing of the cased wellbore and configured to record the waveforms to obtain sonic data;
an ultrasonic sonic tool configured to generate waveforms that travel into the casing of the cased wellbore and configured to record the waveforms to obtain ultrasonic data; and
a processing system configured to:
(i) process ultrasonic data obtained from ultrasonic measurements on the depth interval of the wellbore to determine properties of the innermost annulus;
(ii) process sonic data obtained from sonic measurements on the depth interval of the wellbore to extract features of the sonic data;
(iii) determine properties of the innermost annulus located between an innermost casing and a surrounding casing and the least one outer annulus using machine learning processing, wherein the properties of the innermost annulus and the least one outer annulus include at least one property characterizing state of material in the innermost annulus and at least one property characterizing state of material in the at least one outer annulus, and wherein the features of the sonic data from process (ii) are inputs to the machine learning processing;
(iv) analyze the cement integrity based on the determined properties.

* * * * *